US012660838B2

(12) United States Patent
Gajadeera et al.

(10) Patent No.: US 12,660,838 B2
(45) Date of Patent: Jun. 23, 2026

(54) CORN PROTEIN HYDROLYSATES AND METHODS OF MAKING

(71) Applicant: CARGILL, INCORPORATED, Wayzata, MN (US)

(72) Inventors: Chathurada Sugeeshvarie Gajadeera, Maple Grove, MN (US); Baraem Pamela Ismail, Shoreview, MN (US); Michael A. Mortenson, Rogers, MN (US); Michael A. Porter, Maple Grove, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 880 days.

(21) Appl. No.: 17/289,701

(22) PCT Filed: Nov. 1, 2019

(86) PCT No.: PCT/US2019/059482
§ 371 (c)(1),
(2) Date: Apr. 28, 2021

(87) PCT Pub. No.: WO2020/092964
PCT Pub. Date: May 7, 2020

(65) Prior Publication Data
US 2022/0000143 A1     Jan. 6, 2022

Related U.S. Application Data

(60) Provisional application No. 62/755,175, filed on Nov. 2, 2018.

(51) Int. Cl.
*A23J 3/14* (2006.01)
*A23J 3/34* (2006.01)

(52) U.S. Cl.
CPC . *A23J 3/14* (2013.01); *A23J 3/34* (2013.01); *A23J 3/346* (2013.01)

(58) Field of Classification Search
CPC ................ A23J 3/14; A23J 3/34; A23J 3/346
See application file for complete search history.

(56) References Cited

U.S. PATENT DOCUMENTS

| | | |
|---|---|---|
| 8,101,377 B2 | 1/2012 | Blanton |
| 2004/0067279 A1 * | 4/2004 | Delest ...................... A23J 3/34 |
| | | 426/52 |
| 2010/0221387 A1 | 9/2010 | Cristianini |

| | | | |
|---|---|---|---|
| 2011/0070608 A1 * | 3/2011 | Cho, I ...................... A61P 1/16 |
| | | | 435/68.1 |
| 2011/0097448 A1 | 4/2011 | Wong |
| 2013/0059928 A1 | 3/2013 | Dhalleine |

FOREIGN PATENT DOCUMENTS

| | | | |
|---|---|---|---|
| CH | 662475 A5 | 10/1987 |
| CN | 101390564 A | * | 3/2009 |
| CN | 102387710 A | | 3/2012 |
| CN | 102028093 B | | 6/2013 |
| JP | 5596060 A | | 7/1980 |
| JP | H08242809 A | | 9/1996 |
| WO | 2016154441 A1 | | 9/2016 |
| WO | 2017165748 A1 | | 9/2017 |
| WO | 2018058150 A1 | | 3/2018 |

OTHER PUBLICATIONS

IUPAC Compendium of Chemical Terminology, 3rd ed. International Union of Pure and Applied Chemistry; 2006. Online version 3.0.1, 2019. downloaded on Oct. 23, 2024 from https://doi.org/10.1351/goldbook.S05740. (Year: 2006).*
CN-101390564-A (Clarivate machine translation) (Year: 2009).*
Alizadeh-Pasdar et al., "Comparison of protein surface hydrophobicity measured at various pH values using three different fluorescent probes" Journal of Agricultural and Food Chemistry, 48(2), pp. 328-334, 2000.
Ji, Heli <China Food Additives and Ingredients Handbook>, China Quality Inspection Publishing House China Standards Press, 1st edition, Jun. 2016, p. 272 [English translation].
Kato et al., "Hydrophobicity determined by a fluorescence probe method and its correlation with surface properties of proteins" Biochimica et biophysica acta (BBA)-Protein structure, 624(1), pp. 13-20, 1980.
Nielsen et al., "Improved Method of Determining Food Protein Degree of Hydrolysis", Journal of Food Science, vol. 66, No. 5, 2001, 642-646.
Zheng, Jianxian, <Biotechnology in Functional Foods>, China Light Industry Press, 1st edition, Jan. 2004, pp. 253-256 [English translation].

* cited by examiner

*Primary Examiner* — Nikki H. Dees
*Assistant Examiner* — Andrew E Merriam

(57) ABSTRACT

A composition and method of preparing a corn protein hydrolysate includes obtaining a corn protein composition having a corn protein concentration of at least about 75 wt %, adding an enzyme to a corn protein suspension containing the corn protein composition at a ratio of from about 1:100 to about 1:20 by weight of enzyme to corn protein, controlling the pH and temperature of the corn protein suspension to hydrolyze the corn protein, and terminating the hydrolysis of the corn protein to provide a corn protein hydrolysate that has solubility of from about 7% to about 37% at a pH selected from the group consisting of pH 7.0, pH 3.4, pH 5, and all of pH 7.0, pH 5, and pH 3.4. The corn protein hydrolysate can be used in a variety of food, feed, beverage, and other applications.

11 Claims, 6 Drawing Sheets

CORN PROTEIN HYDROLYSATES AND METHODS OF MAKING

PRIORITY CLAIM

This application is a national phase of International Application No. PCT/US2019/059482, filed Nov. 1, 2019, which claims the benefit of U.S. Provisional Patent Application No. 62/755,175, filed Nov. 2, 2018, each of which is hereby incorporated by reference in its entirety.

TECHNICAL FIELD

The present patent application relates to the field of corn protein for use in food and beverage products. More particularly, the present patent application relates to corn protein hydrolysates with high solubility and methods of preparing the same.

BACKGROUND

Proteins, whether intrinsic to the food or added to the food, can have a significant effect on the processing and eating experience. Proteins are important nutritional components of diets, and manufacturers and consumers frequently seek out protein ingredients to provide added benefit. The benefit could be sensory or economic. More recently, there has been interest in replacing relatively expensive animal-derived proteins with less expensive plant-derived proteins. However, the combination of functional properties of a plant-derived protein ingredient may not match that of an animal-derived protein. This requires modification of the behavior of the plant protein to more closely match the animal protein being replaced.

Methods for modifying ingredients include purification, physical processing, and enzymatic modification. Modifying plant proteins with enzymes is well known in the art, but the application of an enzyme to a protein to achieve a particular behavior is not straightforward. Different enzymes display different ranges and intensities of specificity. This means that two enzymes may lead to very different outcomes when applied to the same protein. The conditions of reaction (for example, pH, temperature, time, and substrate-enzyme ratio) can alter the consequences of a single enzyme on a single protein substrate. The manner in which a protein is treated (the combination and order of exposure to different hydration, shear, temperature, pH, etc.) can influence the ability of the enzyme to react with the protein and thus lead to different outcomes.

SUMMARY

Corn protein has received little attention from the food industry as a potential food ingredient. As an example, no commercial corn protein concentrates or isolates suitable for food use with a protein content of greater than 65 wt % are currently available in the market. Corn protein is allergen-free, which makes it suitable for widespread use and decreases the cleaning cost associated with mixed allergen/non-allergen production. However, corn protein has poor solubility, which limits its applications in some food applications. There remains a need in the food industry to provide a soluble corn protein for use across a range of product categories. In particular, corn protein hydrolysates as described herein having improved solubility for use in various food and beverage applications.

Moreover, it has been discovered that by selection of the corn protein starting material and controlling the degree of hydrolysis of the protein, the resulting corn protein hydrolysates in an aspect exhibit excellent flavor characteristics. In an aspect, the resulting corn protein hydrolysates exhibit a low degree of perceptible bitterness flavor as evaluated by test panel analysis. In an aspect, the resulting corn protein hydrolysate has a Caffeine Equivalents Value of less than 0.25 g/L. In an aspect, the resulting corn protein hydrolysate has a Caffeine Equivalents Value of less than 0.23 g/L. In an aspect, the resulting corn protein hydrolysate has a Caffeine Equivalents Value of less than 0.21 g/L. In an aspect, the resulting corn protein hydrolysate has a Caffeine Equivalents Value of from 0.1 g/L to 0.25 g/L. In an aspect, the resulting corn protein hydrolysate has a Caffeine Equivalents Value of from 0.1 g/L to 0.23 g/L. In an aspect, the resulting corn protein hydrolysate has a Caffeine Equivalents Value of from 0.1 g/L to 0.21 g/L. In an aspect, the resulting corn protein hydrolysate has a Caffeine Equivalents Value of from 0.15 g/L to 0.25 g/L. In an aspect, the resulting corn protein hydrolysate has a Caffeine Equivalents Value of from 0.15 g/L to 0.23 g/L. In an aspect, the resulting corn protein hydrolysate has a Caffeine Equivalents Value of from 0.15 g/L to 0.21 g/L.

In an aspect, a corn protein hydrolysate is provided having a corn protein concentration of at least about 75 wt % and a solubility of from about 7% to about 37% at a pH selected from the group consisting of pH 7.0, pH 3.4, pH 5, and all of pH 7.0, pH 5, and pH 3.4. In an aspect, the corn protein hydrolysate has a solubility of from about 7% to about 20% at a pH selected from the group consisting of pH 7.0, pH 3.4, pH 5, and all of pH 7.0, pH 5, and pH 3.4. In an aspect, the corn protein hydrolysate has a solubility of from about 15% to about 28% at a pH selected from the group consisting of pH 7.0, pH 3.4, pH 5, and all of pH 7.0, pH 5, and pH 3.4. In an aspect, the corn protein hydrolysate has a solubility of from about 24% to about 35% at a pH selected from the group consisting of pH 7.0, pH 3.4, pH 5, and all of pH 7.0, pH 5, and pH 3.4.

In an aspect, the corn protein hydrolysate has a degree of hydrolysis (based on total protein) of from about 1% to about 17%. In an aspect, the corn protein hydrolysate has a degree of hydrolysis of from about 1% to about 7%. In an aspect, the corn protein hydrolysate has a degree of hydrolysis of from about 1% to about 5%. In an aspect, the corn protein hydrolysate has a degree of hydrolysis of from about 8% to about 14%. In an aspect, the corn protein hydrolysate has a degree of hydrolysis of from about 10% to about 17%. In an aspect, the corn protein hydrolysate has a degree of hydrolysis of from about 3% to about 8%. In an aspect, the corn protein hydrolysate has a degree of hydrolysis of from about 4% to about 6%.

In an aspect, a method of preparing a corn protein hydrolysate comprises obtaining a corn protein composition (i.e., the starting material), adding an enzyme to a corn protein suspension containing the corn protein composition at a ratio from about 1:100 to about 1:20 by weight of enzyme to corn protein, controlling the pH and temperature of the corn protein suspension to hydrolyze the corn protein, and terminating the hydrolysis of the corn protein to provide a corn protein hydrolysate that has a degree of hydrolysis of from about 1% to about 17% and a solubility of from about 7% to about 37% at a pH selected from the group consisting of pH 7.0, pH 3.4, pH 5, and all of pH 7.0, pH 5, and pH 3.4. In an aspect, the thus provided corn protein hydrolysate is then dried.

In an aspect, a method of preparing a corn protein hydrolysate comprises obtaining a corn protein composition (i.e., the starting material) having a corn protein concentration of at least about 75 wt %, adding the corn protein composition to water at a temperature of from about 40° C. to about 55° C. to obtain a 5% (w/v) corn protein suspension, adjusting pH of the corn protein suspension to a pH level of from about 5.0 to about 6.0, adding an enzyme to the corn protein composition at a ratio from about 1:100 to about 1:20 by weight of enzyme to corn protein, and hydrolyzing the corn protein suspension while maintaining the temperature and the pH, and terminating the hydrolysis of the corn protein to provide a corn protein hydrolysate that has a degree of hydrolysis of from about 1% to about 17% and a solubility of from about 7% to about 37% at a pH selected from the group consisting of pH 7.0, pH 3.4, pH 5, and all of pH 7.0, pH 5, and pH 3.4. In an aspect, the thus provided corn protein hydrolysate is then dried.

The enhanced solubility of the corn protein hydrolysate described herein can facilitate use of the corn protein hydrolysate in multiple product categories, such as food, beverages, and feed. In an aspect, corn protein hydrolysate can be included as a protein source additive in a variety of non-liquid food products. The present corn protein hydrolysate advantageously can enhance the protein content of the food products without introducing objectionable flavors. Additionally, the corn protein hydrolysate described herein exhibits superior texture properties, and provide enhanced protein content to foods while not adversely affecting organoleptic properties such as mouthfeel. For example, unhydrolyzed corn protein can have a grainy or gritty feel, while the present corn protein hydrolysate can exhibit a superior, smoother mouthfeel. Enhanced solubility can increase other functionalities important in food, and protein modification can change those functionalities with no change in solubility.

Corn protein is a valuable source of protein for nutrition. Nutritional benefit can be described in many ways and protein consumption has well-described effects on physiology. Leucine is one of the amino acids found in corn protein, and corn protein is one of the richer sources of leucine among proteins. Leucine is especially important for stimulation of muscle protein synthesis. This is of interest to consumers at all ages, but especially among the elderly. Younger consumers, interested in increasing their muscle mass, often consume proteins containing ample leucine. Some of these proteins are expensive or only available from animal sources. Corn protein is less expensive than most animal proteins and has the sustainability benefits of being plant based. One of the common ways that people seeking a muscle protein synthesis benefit consume protein is as a beverage. Unmodified corn protein has poor solubility and dispersibility in water, but the product of the current invention is better suited to making a beverage. With improved solubility and low bitterness, the corn protein can be formulated alone or in combination with other proteins to create a nutritious beverage with desirable sensory properties. The modified protein may be more suitable for use in other applications as well.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
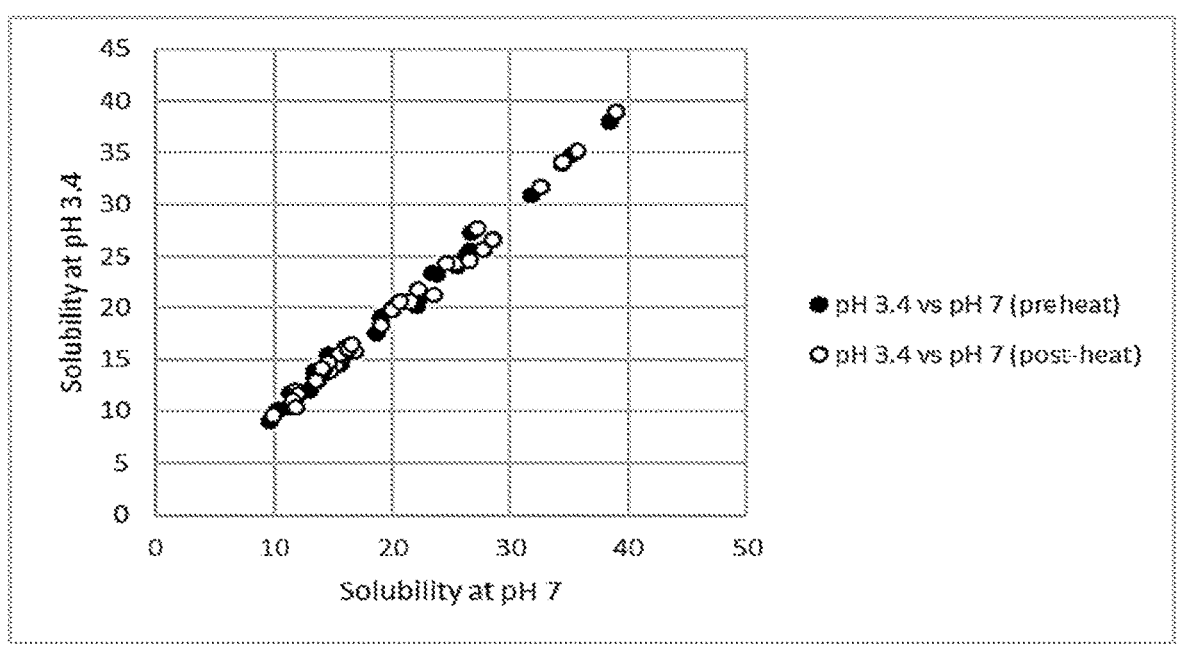
FIG. 1 is a graph of the relationship between protein solubility at pH 3.4 and pH 7.0.

"Corn protein composition" refers to a composition that comprises a corn protein that has not undergone hydrolysis; in other words, it is the starting material used in the hydrolysis reaction. The corn protein content in such composition can be less than 100% protein. The corn protein content in such composition ranges from at least 75 wt %, and at least 79 wt % protein. Protein content is determined by AACCI 46-30.01 (Crude Protein—Combustion Method) using a nitrogen analyzer (LECO TruSpecNTM, St. Joseph, Michigan USA) and a conversion factor of 6.25.

"Corn protein hydrolysate" or "hydrolysate" refers to a corn protein composition that has undergone limited hydrolysis under controlled conditions.

"Degree of hydrolysis (DH)" refers to the proportion of cleaved peptide bonds in the hydrolysate. DH is determined by the o-phthaldialdehyde (OPA) method.

"Protein solubility" refers to the concentration of the protein that is present in the liquid phase relative to the amount of protein that is present in the liquid and solid phase at equilibrium. Protein solubility can be reported as a percentage and is determined by measuring protein content in the supernatant after applying centrifugal force to a solution prepared at specific protein content, pH and salt concentration, relative to the total protein in the solution prior to centrifugation.

Corn Protein Hydrolysate

The corn protein hydrolysate is provided having a corn protein concentration of at least about 75 wt % and a solubility of from about 7% to about 37% at a pH selected from the group consisting of pH 7.0, pH 3.4, pH 5, and all of pH 7.0, pH 5, and pH 3.4. In an aspect, the corn protein hydrolysate has a solubility of from about 7% to about 37% at any pH of from 3.4 to 7, or the corn protein hydrolysate has a solubility of from about 7% to about 37% at any pH of from 3.4 to 9.

In an aspect, the corn protein concentration is at least about 79 wt %. In an aspect, the corn protein concentration is at least about 82 wt %. In an aspect, the corn protein concentration is at least about 85 wt %. In an aspect, the corn protein concentration is at least about 89 wt %. In an aspect, the corn protein concentration is at least about 92 wt %. In an aspect, the corn protein concentration is at least about 98 wt %.

In an aspect, the corn protein concentration is from about 79 wt % to about 89 wt %. In an aspect, the corn protein concentration is from about 82 wt % to about 89 wt %. In an aspect, the corn protein concentration is from about 85 wt % to about 89 wt %. In an aspect, the corn protein concentration is from about 85 wt % to about 98 wt %. In an aspect, the corn protein concentration is from about 89 wt % to about 98 wt %. In an aspect, the corn protein concentration is from about 92 wt % to about 98 wt %. In an aspect, the corn protein concentration is from about 95 wt % to about 100 wt %. In an aspect, the corn protein concentration is from about 98 wt % to about 100 wt %.

In an aspect, the corn protein hydrolysate has a solubility of from about 7% to about 37% at pH 7.0. In an aspect, the corn protein hydrolysate has a solubility of from about 7% to about 20% at pH 7.0. In an aspect, the corn protein hydrolysate has a solubility of from about 15% to about 28% at pH 7.0. In an aspect, the corn protein hydrolysate has a solubility of from about 24% to about 35% at pH 7.0; or wherein the solubility is from about 16% to about 24% at pH 7.0.

In an aspect, the corn protein hydrolysate has a solubility of from about 7% to about 37% at pH 3.4. In an aspect, the corn protein hydrolysate has a solubility of from about 7% to about 20% at pH 3.4. In an aspect, the corn protein hydrolysate has a solubility of from about 15% to about 28% at pH 3.4. In an aspect, the corn protein hydrolysate has a solubility of from about 24% to about 35% at pH 3.4; or wherein the solubility is from about 16% to about 24% at pH 3.4.

It has been found that corn protein hydrolysates as described herein can advantageously exhibit the desired solubility characteristics without sensitivity to pH. In other words, a given corn protein hydrolysate composition will have essentially the same solubility characteristics regardless of whether the pH of the composition is at any pH from 3.4 to 9 when the solubility is measured. For purposes of convenience, testing of the solubility of the corn protein hydrolysate composition at pH 3.4, 5 and 7 is an indication of the sensitivity of the solubility characteristics of the composition at relevant pH values. Compositions as described herein exhibit excellent solubility characteristics at pH values between 3.4 and 7, for example, at 5.

In an aspect, the corn protein hydrolysate has a solubility of from about 7% to about 37% at a pH of both pH 7.0 and pH 3.4. In an aspect, the corn protein hydrolysate has a solubility of from about 7% to about 20% at a pH of both pH 7.0 and pH 3.4. In an aspect, the corn protein hydrolysate has a solubility of from about 15% to about 28% at a pH of both pH 7.0 and pH 3.4. In an aspect, the corn protein hydrolysate has a solubility of from about 24% to about 35% at a pH of both pH 7.0 and pH 3.4. In an aspect, the corn protein hydrolysate has a solubility of from about 30% to about 37% at a pH of both pH 7.0 and pH 3.4.

In general, the desired properties of the corn protein hydrolysate are achieved when the corn protein hydrolysate has a degree of hydrolysis of from about 1% to about 17%. Certain ranges of degrees of hydrolysis may provide particular benefit for use in certain food products. In an aspect, the corn protein hydrolysate can range from about 1% to about 7%. In an aspect, the degree of hydrolysis can range from about 8% to about 14%. In an aspect, the degree of hydrolysis can range from about 10% to about 17%. In an aspect, the degree of hydrolysis can be from about 3% to about 8%. In an aspect, the degree of hydrolysis can be from about 4% to about 6%.

In an aspect, the corn protein hydrolysate can be provided in the form of a solution or slurry. In an aspect the corn protein hydrolysate can be provided in the form of a concentrated solution, paste, or slurry, e.g., having a solids content of from about 40 wt % to about 80 wt % solids, or having a solids content of from about 40 wt % to about 60 wt % solids. Providing the corn protein hydrolysate provides handling advantages, such are ease in addition and mixing of the hydrolysate into a liquid, and avoidance of challenges of handling powders. In an aspect the corn protein hydrolysate is provided in the form of a solution, paste, or slurry in aseptic packaging. In an aspect, the corn protein hydrolysate can be available in a powder form. The powder composition of the corn protein hydrolysate can contain less than 100% corn protein. In an aspect, the powder composition of the corn protein hydrolysate can contain at least about 70 wt % corn protein. In an aspect, the powder composition of the corn protein hydrolysate can contain at least about 75 wt % corn protein. In an aspect, the powder composition of the corn protein hydrolysate can contain at least about 80 wt % corn protein. In an aspect, the powder composition of the corn protein hydrolysate can contain about 79 wt % corn protein. In an aspect, the powder composition of the corn protein hydrolysate can contain about 80 wt % corn protein. In an aspect, the powder composition of the corn protein hydrolysate has a moisture content of less than 10%.

Method of Preparing the Hydrolysate

In the present method, a controlled and limited hydrolysis of a corn protein composition is carried out to provide a corn protein hydrolysate having the indicated solubility characteristics. In an aspect, the method includes obtaining a corn protein composition, adding an enzyme to the corn protein composition and hydrolyzing the corn protein composition under controlled conditions to form a corn protein hydrolysate at a desired degree of hydrolysis.

As a first step, a corn protein composition is obtained having a corn protein concentration of at least about 75 wt %. In an aspect, the corn protein composition is a concentrate or an isolate suitable for food use. In an aspect, the corn protein composition is a substantially destarched corn gluten material that has been washed with a solvent comprising water and a water-miscible organic solvent to obtain a corn protein composition with the desired wt % protein on a dry basis. "Destarched" refers to the starting corn gluten material having a residual insoluble starch solids in the range from about 0.1 wt % to 3.0 wt % (ds), as measured by Ewers polarimetric method ISO 10520:1997. In at least certain aspects, the residual starch solids in such starting corn gluten material may be in the range from about 0.1 to 2.0 wt % (ds), about 0.1 to 1.0 wt % (ds), or about 0.1 to 0.75 wt % (ds). Methods are described, for example, in WO2016/154441 and WO 2018/058150 assigned to Cargill Incorporated, which are incorporated herein by reference. Washing of source corn protein compositions to provide starting material corn protein compositions in an aspect may remove undesirable remove many non-protein components (pigments, mycotoxins, carbohydrates (such as sugars), organic acids, oils, etc.) from the starting corn material.

In an aspect, the corn protein concentration is at least about 79 wt %. In an aspect, the corn protein concentration is at least about 82 wt %. In an aspect, the corn protein concentration is at least about 85 wt %. In an aspect, the corn protein concentration is at least about 89 wt %. In an aspect, the corn protein concentration is at least about 92 wt %. In an aspect, the corn protein concentration is at least about 98 wt %.

In an aspect, the corn protein concentration is from about 79 wt % to about 89 wt %. In an aspect, the corn protein concentration is from about 82 wt % to about 89 wt %. In an aspect, the corn protein concentration is from about 85 wt % to about 89 wt %. In an aspect, the corn protein concentration is from about 85 wt % to about 98 wt %. In an aspect, the corn protein concentration is from about 89 wt % to about 98 wt %. In an aspect, the corn protein concentration is from about 92 wt % to about 98 wt %. In an aspect, the corn protein concentration is from about 95 wt % to about 100 wt %. In an aspect, the corn protein concentration is from about 98 wt % to about 100 wt %.

In an aspect, the corn protein composition is a substantially destarched corn gluten material that has been treated with an oxidant, to provide corn protein composition starting material having a free sulfite concentration of less than 150 ppm on an as-is basis. IN an aspect, the oxidant can be, for example but not limited to, hydrogen peroxide, ozone gas, air, sodium hypochlorite, a combination of potassium bromate and ethanol, catalase, peroxidase, or a combination thereof. In preferred aspects, the oxidant is hydrogen peroxide. Methods for such treatment are described in WO 2017/165748, assigned to Cargill Incorporated, which is incorporated herein by reference.

The corn protein composition is added to a solvent system comprising water at a temperature and in an amount suitable to provide a corn protein suspension. In an aspect, the solvent system is water. In an aspect, the solvent system comprises water and a suitable food grade co-solvent. In an aspect, the corn protein composition is added to the solvent system at a temperature of from about 40° C. to about 70° C. In an aspect, the corn protein composition is added to a solvent system at a temperature of from about 45° C. to about 55° C. In an aspect, the corn protein composition is added to the solvent system in an amount to obtain about a corn protein suspension having a solids content of from about 1% (w/v) to about 25% (w/v). In an aspect, the corn protein composition is added to the solvent system in an amount to obtain from about 1 to about 15% (w/v) corn protein suspension. In an aspect, the corn protein composition is added to the solvent system in an amount to obtain from about 3 to about 8% (w/v) corn protein suspension. In an aspect, the corn protein composition is added to the solvent system in an amount to obtain about a 5% (w/v) corn protein suspension.

An enzyme is added to the corn protein suspension containing the corn protein composition at a ratio of from about 1:100 to about 1:20 by weight of enzyme to corn protein. In an aspect, the pH of the corn protein suspension is adjusted and/or maintained at a desired level prior to addition of the enzyme. In an aspect, the pH of the corn protein suspension is adjusted and/or maintained at from about 5.0 to about 6.0 prior to addition of the enzyme.

In an aspect, the enzyme can be added at a ratio from about 1:55 to about 1:20 (by weight) of enzyme to corn protein. In an aspect, the enzyme can be added at a ratio from about 1:55 to about 1:45 (by weight) of enzyme to corn protein. In an aspect, the enzyme can be added at a ratio from about 1:30 to about 1:20 (by weight) of enzyme to corn protein. In an aspect, the enzyme can be added at a ratio from about 1:50 to about 1:25 (by weight) of enzyme to corn protein. In an aspect, the ratio of enzyme to corn protein is about 1:50. In an aspect, the ratio of enzyme to corn protein is about 1:37.5. In an aspect, the ratio of enzyme to corn protein is about 1:25. In an aspect, the ratio of enzyme to corn protein is about 1:100.

The term "enzyme" means a composition having an active enzyme product. One skilled in the art will appreciate enzyme activity and inclusion level can be varied within an enzyme product. In an aspect, the enzyme is a protease. In an aspect, the protease enzyme is obtained from a fungus. In an aspect, the protease is obtained from the fungus *Aspergillus oryzae*. In an example, the fungal enzyme can be Protease M "Amano" SD from Amano Enzyme Inc. While not being bound by theory, it is believed that fungal enzymes in particular when used in the hydrolysis process as described herein targets specific sites on the protein resulting in the release of hydrophilic peptides that are not perceived as bitter, and may when used under the conditions as described herein minimize protein off-flavor.

In an aspect, the pH and temperature of the corn protein suspension containing the enzyme is controlled for a time sufficient to hydrolyze the corn protein to the desired degree of hydrolysis. In an aspect, the pH of the corn protein suspension during hydrolysis is from about 5.0 to about 6.0. In an aspect, the pH of the corn protein suspension during hydrolysis is about 5.5. In an aspect, the temperature of the corn protein suspension during hydrolysis is from about 40° C. to about 70° C. In an aspect, the temperature of the corn protein suspension during hydrolysis is from about 45° C. to about 55° C. In an aspect, the temperature of the corn protein suspension during hydrolysis is about 50° C. In an aspect, the hydrolysis of the corn protein suspension is carried out for a time of from about 15 minutes to about 180 minutes. In an aspect, the hydrolysis of the corn protein suspension is carried out for a time of from about 30 minutes to about 120 minutes. In an aspect, the hydrolysis of the corn protein suspension is carried out for a time of from about 45 minutes to about 90 minutes.

In an aspect, the hydrolysis of the corn protein suspension is terminated when the corn protein hydrolysate has a degree of hydrolysis of from about 1% to about 17%. In an aspect, the hydrolysis of the corn protein suspension is terminated when the corn protein hydrolysate has a degree of hydrolysis of from about 1% to about 7%. In an aspect, the hydrolysis of the corn protein suspension is terminated when the corn protein hydrolysate has a degree of hydrolysis of from about 8% to about 14%. In an aspect, the hydrolysis of the corn protein suspension is terminated when the corn protein hydrolysate has a degree of hydrolysis of from about 10% to about 17%. In an aspect, the hydrolysis of the corn protein suspension is terminated when the corn protein hydrolysate has a degree of hydrolysis of from about 3% to 8%. In an aspect, the hydrolysis of the corn protein suspension is terminated when the corn protein hydrolysate has a degree of hydrolysis of from about 4% to about 6%.

In an aspect, the pH and temperature of the corn protein suspension containing the enzyme is controlled for a time sufficient to hydrolyze the corn protein so that the corn protein hydrolysate has a solubility of from about 7% to about 37% at a pH selected from the group consisting of pH 7.0, pH 3.4, pH 5, and all of pH 7.0, pH 5, and pH 3.4. In an aspect, the pH and temperature of the corn protein suspension containing the enzyme is controlled for a time sufficient to hydrolyze the corn protein so that the corn protein hydrolysate has a solubility of from about 7% to about 20% at a pH selected from the group consisting of pH 7.0, pH 3.4, pH 5, and all of pH 7.0, pH 5, and pH 3.4. In an aspect, the pH and temperature of the corn protein suspension containing the enzyme is controlled for a time sufficient to hydrolyze the corn protein so that the corn protein hydrolysate has a solubility of from about 15% to about 28% at a pH selected from the group consisting of pH 7.0, pH 3.4, pH 5, and all of pH 7.0, pH 5, and pH 3.4. In an aspect, the pH and temperature of the corn protein suspension containing the enzyme is controlled for a time sufficient to hydrolyze the corn protein so that the corn protein hydrolysate has a solubility of from about 24% to about 35% at a pH selected from the group consisting of pH 7.0, pH 3.4, pH 5, and all of pH 7.0, pH 5, and pH 3.4. In an aspect, the pH and temperature of the corn protein suspension containing the enzyme is controlled for a time sufficient to hydrolyze the corn protein so that the corn protein hydrolysate has a solubility of from about 16% to about 24% at a pH selected from the group consisting of pH 7.0, pH 3.4, pH 5, and all of pH 7.0, pH 5, and pH 3.4. In an aspect, the pH and temperature of the corn protein suspension containing the enzyme is controlled for a time sufficient to hydrolyze the corn protein so that the corn protein hydrolysate has a solubility of from about 24% to about 35% at a pH selected from the group consisting of pH 7.0, pH 3.4, pH 5, and all of pH 7.0, pH 5, and pH 3.4. In an aspect, the pH and temperature of the corn protein suspension containing the enzyme is controlled for a time sufficient to hydrolyze the corn protein so that the corn protein hydrolysate has a solubility of from about 30% to about 37% at a pH selected from the group consisting of pH 7.0, pH 3.4, pH 5, and all of pH 7.0, pH 5, and pH 3.4

In an aspect of the present method, the corn protein hydrolysate is dried after completion of the desired hydrolysis. In an aspect, the drying is by freeze-drying or spray-drying. In an aspect, the powder composition of the corn protein hydrolysate has a moisture content of less than 10%.

In an aspect, the corn protein hydrolysate is provided in powder form. In an aspect, the powder composition of the corn protein hydrolysate contains at least about 75 wt % corn protein. In an aspect, the powder composition of the corn protein hydrolysate contains at least about 79 wt % corn protein. In an aspect, the powder composition of the corn protein hydrolysate contains at least about 80 wt % corn protein. In an aspect, the powder composition of the corn protein hydrolysate contains at least about 85 wt % corn protein. In an aspect, the powder composition of the corn protein hydrolysate contains at least about 90 wt % corn protein.

In an aspect, a method of preparing a corn protein hydrolysate can include obtaining a corn protein composition having a corn protein concentration of at least about 75 wt %, mixing with water at a temperature from about 45° C. to about 55° C. to obtain a 5% (w/v) corn protein suspension, adjusting pH of the corn protein suspension from about 5.0 to about 6.0, adding an enzyme to the corn protein suspension at a ratio from about 1:100 to 1:25 by weight of enzyme to corn protein, and hydrolyzing the corn protein suspension while maintaining the temperature and the pH, and terminating the hydrolysis of the corn protein to provide a corn protein hydrolysate that has a solubility of from about 7% to about 37% at a pH selected from the group consisting of pH 7.0, pH 3.4, pH 5, and all of pH 7.0, pH 5, and pH 3.4. In an aspect, the step of hydrolyzing the corn protein suspension is carried out for a time of about 30 minutes to about 120 minutes while maintaining the temperature and the pH to obtain a corn protein hydrolysate.

In an aspect, hydrolyzing the corn protein composition can be performed at a temperature between about 50° C. and about 60° C., preferably 50° C. In an aspect, hydrolyzing the corn protein composition can be performed at a pH ranging between about 5.0 and about 6.0, preferably 5.5. In an aspect, a time for hydrolyzing the corn protein composition is between about 30 minutes and about 120 minutes, preferably 60 minutes.

In an aspect, a method of preparing a corn protein hydrolysate can include obtaining a corn protein composition, mixing with water at a temperature of about 50° C. to obtain a 5% (w/v) corn protein suspension, adding an enzyme to the corn protein suspension at a ratio of about 1:50 by weight of enzyme to corn protein, adjusting pH of the corn protein suspension to about 5.5, and hydrolyzing the corn protein suspension for about 60 minutes, while maintaining the temperature and the pH, to obtain a corn protein hydrolysate. The corn protein hydrolysate, produced under a controlled and limited hydrolysis as described herein, can have a total protein degree of hydrolysis of from about 1.5% to about 3%, or of about 2.4%, and a solubility of at least from about 16% to about 20%, or of about 17%, at pH 7.0.

In an aspect, a method of preparing a corn protein hydrolysate can include obtaining a corn protein composition, mixing with water at a temperature of about 48° C. to obtain a 5% (w/v) corn protein suspension, adding an enzyme to the corn protein suspension at a ratio of about 1:50 by weight of enzyme to corn protein, adjusting pH of the corn protein suspension to about 5.5, and hydrolyzing the corn protein suspension for about 120 minutes, while maintaining the temperature and the pH, to obtain a corn protein hydrolysate. The corn protein hydrolysate, produced under a controlled and limited hydrolysis as described herein, can have a total protein degree of hydrolysis from about 4% to about 6%, or about 5%, and a solubility of at least from about 21% to about 24%, or about 21%, at pH 7.0.

In an aspect, a method of preparing a corn protein hydrolysate can include obtaining a corn protein composition, mixing with water at a temperature of about 50° C. to obtain a 5% (w/v) corn protein suspension, adding an enzyme to the corn protein suspension at a ratio of about 1:25 by weight of enzyme to corn protein, adjusting pH of the corn protein suspension to about 5.5, and hydrolyzing the corn protein suspension for about 90 minutes, while maintaining the temperature and the pH, to obtain a corn protein hydrolysate. The corn protein hydrolysate, produced under a controlled and limited hydrolysis as described herein, can have a degree of hydrolysis from about 6% to about 10%, or about 8% to about 9%, and a solubility of at least from about 15% to about 25% at pH 7.

In general, hydrolyzed proteins often have a bitter or astringent taste. Surprisingly, the corn protein hydrolysates of the present patent application did not have a bitter flavor.

In an aspect, a method of preparing a corn protein hydrolysate comprises:

obtaining a corn protein composition;

adding the corn protein composition to water at a temperature from about 45° C. to about 55° C. to obtain a 5% (w/v) corn protein suspension;

adjusting pH of the corn protein suspension from about 5.0 to about 6.0;

adding an enzyme to the corn protein suspension at a ratio from about 1:100 to about 1:25 by weight of enzyme to corn protein;

hydrolyzing the corn protein suspension for about 30 minutes to about 120 minutes, while maintaining the temperature and the pH, to obtain a corn protein hydrolysate, wherein the corn protein hydrolysate has a degree of hydrolysis from about 1% to about 32% and
a solubility of at least from about 7% and to about 47%
at pH 7.0; and drying the corn protein hydrolysate.

In an aspect, a method of preparing a corn protein
hydrolysate comprises:

obtaining a corn protein composition;

adding an enzyme to the corn protein composition at a
ratio from about 1:100 to about 1:25 by weight of
enzyme to corn protein; and hydrolyzing the corn protein composition at a pH ranging
from about 5.0 to about 6.0 and at a time ranging from
about 30 minutes to about 120 minutes to obtain a corn
protein hydrolysate, wherein the corn protein hydroly-
sate has a degree of hydrolysis from about 1% to about
20% and a solubility of at least from about 7% and to
about 36% at pH 7.0.

In an aspect, the corn protein hydrolysate is provided as
an ingredient in a food product, such as a beverage or a
non-liquid food. In an aspect, the corn protein hydrolysate is
present as from about 1 wt % to about 10 wt % of a beverage.
In an aspect, the corn protein hydrolysate is present as from
about 2 wt % to about 10 wt % of the beverage. In an aspect,
the corn protein hydrolysate is present as from about 3 wt %
to about 10 wt % of the beverage. In an aspect, the corn
protein hydrolysate is present as from about 2 wt % to about
8 wt % of the beverage. In an aspect, the corn protein
hydrolysate is present as from about 2 wt % to about 6 wt
% of the beverage. In an aspect, the corn protein hydrolysate
is present as from about 2 wt % to about 5 wt % of a
beverage. In an aspect, the beverages including the corn
protein hydrolysate described in this paragraph exhibit a low
degree of perceptible bitterness flavor as evaluated by test
panel analysis. In an aspect, a beverage including the corn
protein hydrolysate has a Caffeine Equivalents Value of less
than 0.25 g/L. In an aspect, a beverage including the corn
protein hydrolysate has a Caffeine Equivalents Value of less
than 0.23 g/L. In an aspect, a beverage including the corn
protein hydrolysate has a Caffeine Equivalents Value of less
than 0.21 g/L. In an aspect, a beverage including the corn
protein hydrolysate has a Caffeine Equivalents Value of
from 0.1 to 0.25 g/L. In an aspect, a beverage including the
corn protein hydrolysate has a Caffeine Equivalents Value of
from 0.1 to 0.23 g/L. In an aspect, a beverage including the
corn protein hydrolysate has a Caffeine Equivalents Value of
from 0.1 to 0.21 g/L. In an aspect, a beverage including the
corn protein hydrolysate has a Caffeine Equivalents Value of
from 0.15 to 0.25 g/L. In an aspect, a beverage including the
corn protein hydrolysate has a Caffeine Equivalents Value of
from 0.15 to 0.23 g/L. In an aspect, a beverage including the
corn protein hydrolysate has a Caffeine Equivalents Value of
from 0.15 to 0.21 g/L.

EXAMPLES

The present patent application will be further described in
the following examples, which do not limit the scope of the
invention in the claims.

Example 1

Two samples of the corn protein composition were puri-
fied according to WO2016/154441, WO 2017/165748, and
WO 2018/058150 assigned to Cargill Incorporated, which
are incorporated herein by reference. The protein concen-
tration of each sample is shown in Table 1. Sample CP1 composition contains 82.88 wt % protein and Sample CP-
RTE composition contains 79.44 wt % protein.

TABLE 1

| Corn protein composition | |
| --- | --- |
| Sample | Protein (%) |
| CP1 | 82.88 |
| CP-RTE | 79.44 |

Corn protein hydrolysates were made from Sample CP1
using the fungal enzyme, Protease M (Amano Enzyme Inc.)
at a ratio of enzyme to protein (E:P) from about 1:100, 1:50,
1:37.5, and 1:25. Time (30 min, 60 min, 90 min, 100 min,
and 120 min), temperature (40° C., 45° C., 50° C., and 55°
C.), and pH (5.0, 5.5, and 6.0) were monitored during
hydrolysis. The DH and solubility properties of the CP1
hydrolysates produced under different hydrolysis conditions
are shown in Tables 2 and 3, respectively.

Hydrolysis of Sample CP1 was carried out upon mixing
a 5% protein solution for 1 hour in water at the conditions
listed in Table 2 in a small scale (volume of hydrolysate was
150 ml). The enzyme, Protease M, was then added and the
pH was adjusted every 10 minutes (30 minute incubation) or
15 minutes (60 or longer incubation) to maintain the desired
pH. Hydrolysis was followed by neutralizing to pH 7.0 with
1M NaOH and inactivating the enzyme by heating to 75° C.
for 5 min. After hydrolysis, the sample was freeze dried.

TABLE 2

| Production conditions and DH of CP1 hydrolysates | | | | | | |
| --- | --- | --- | --- | --- | --- | --- |
| Sample | pH | Temp (° C.) | Time (min) | E:P | DH of soluble fraction | DH of total protein |
| 1 | 5 | 45 | 60 | 1:50 | 5.27 | 2.31 |
| 2 | 5 | 45 | 120 | 1:50 | 13.11 | 6.39 |
| 3 | 5 | 45 | 60 | 1:25 | 12.14 | 6.26 |
| 4 | 5 | 45 | 120 | 1:25 | 28.91 | 14.19 |
| 5 | 5 | 50 | 90 | 1:37.5 | 16.58 | 8.63 |
| 6 | 5 | 50 | 90 | 1:25 | 19.32 | 10.38 |
| 7 | 5 | 55 | 60 | 1:37.5 | 9.43 | 4.58 |
| 8 | 5 | 55 | 120 | 1:50 | 5.65 | 2.61 |
| 9 | 5 | 55 | 60 | 1:25 | 13.78 | 7.55 |
| 10 | 6 | 45 | 90 | 1:37.5 | 4.74 | 1.67 |
| 11 | 6 | 45 | 60 | 1:37.5 | 3.21 | 0.53 |
| 12 | 6 | 45 | 120 | 1:25 | 9.1 | 4.54 |
| 13 | 6 | 55 | 60 | 1:25 | 13.89 | 6.27 |
| 14 | 6 | 55 | 120 | 1:25 | 8.67 | 4.68 |
| 15 | 6 | 50 | 60 | 1:50 | 4.55 | 2.08 |
| 16 | 6 | 50 | 90 | 1:50 | 6.25 | 2.22 |
| 17 | 6 | 55 | 60 | 1:50 | 3.83 | 1.15 |
| 18 | 6 | 55 | 90 | 1:50 | 4.28 | 1.71 |
| 19 | 5.5 | 45 | 60 | 1:50 | 4.99 | 1.17 |
| 20 | 5.5 | 45 | 90 | 1:50 | 5.14 | 1.93 |
| 21 ("DH5")[1] | 5.5 | 50 | 60 | 1:50 | 5.06 | 2.36 |
| 22 | 5.5 | 50 | 60 | 1:25 | 11.6 | 3.48 |
| 23 | 5.5 | 50 | 90 | 1:50 | 11.48 | 3.00 |
| 24 ("DH16") | 5.5 | 50 | 90 | 1:25 | 16 | 8.61 |
| 25 | 5.5 | 50 | 120 | 1:25 | 30.4 | 17.51 |
| 26 | 5.5 | 55 | 60 | 1:50 | 5.97 | 2.29 |
| 27 | 5.5 | 55 | 90 | 1:50 | 8.16 | 4.32 |
| 28 | 6 | 50 | 30 | 1:50 | 2.60 | below 0.01 |
| 29 | 6 | 55 | 30 | 1:50 | 3.64 | below 0.01 |
| 30 | 5.5 | 50 | 30 | 1:100 | 1.17 | below 0.01 |
| 31 | 5.5 | 50 | 60 | 1:100 | 2.13 | 0.91 |
| 32 | 5.5 | 50 | 100 | 1:25 | 21.5 | 13.07 |
| 33 | 5.5 | 50 | 30 | 1:50 | 4.26 | 1.13 |
| 34 | 5.5 | 55 | 30 | 1:50 | 4.04 | 1.08 |

TABLE 2-continued

Production conditions and DH of CP1 hydrolysates

| Sample | pH | Temp (° C.) | Time (min) | E:P | DH of soluble fraction | DH of total protein |
|---|---|---|---|---|---|---|
| 35 | 5.5 | 40 | 60 | 1:50 | 2.87 | 0.71 |
| 36 | 5.5 | 40 | 90 | 1:50 | 4.77 | 1.52 |
| 37 ("DH10") | 5.5 | 48 | 120 | 1:50 | 10.86 | 5.20 |
| 38 ("DH30**") | 5 | 50.5 | 120 | 1:25 | 30.4 | 16.65 |
| 39 | 5.5 | 50 | 60 | None | Below 0.01 | below 0.01 |
| 40 | 5.5 | 50 | 90 | None | Below 0.01 | below 0.01 |

[1]Samples "DH5", "DH10", "DH16", "DH3O**" as reported in subsequent examples and shown in the Figures are identified in this table. The DH number in this sample identifier is used for convenience of identification of the sample being tested. This DH number generally corresponds to the measured degree of hydrolysis of the soluble fraction (i.e. supernatant) of the sample.

The degree of hydrolysis of the supernatant was determined using OPA method described in Nielsen, Petersen & Dambmann, 2001, Improved Method for Determining Food Protein Degree of Hydrolysis, Journal of Food Science, 642-646. Corn protein (0.01 g) was mixed with 1 ml of 1% sodium dodecyl sulfate (SDS) and was left overnight at room temperature, while stirring. The sample was centrifuged for 13000 rpm for 10 minutes, and 100 μL of supernatant was diluted 10 times with double distilled water. OPA reagent, serine standard and testing the samples were carried out as described in Nielsen, et al. BCA assay was done to determine the protein concentration of the supernatants following the instructions of Pierce BCA Protein Assay Kit (Thermo Scientific, #23227) Total protein content of the sample was determined by AACCI 46-30.01 (Crude Protein—Combustion Method) using a nitrogen analyzer (LECO TruSpecNTM, St. Joseph, Michigan USA) and a conversion factor of 6.25. Solubility of the untreated CP1 (CP1 processed using all conditions except enzyme addition) and CP1 hydrolysate was determined at pH 3.4 and 7 with and without thermal treatment. Protein solutions (10 mL at 5% protein) were prepared based on the protein content of the powder (AACCI 46-30.01) and a conversion factor of 6.25 at pH 3.4 and 7.0 with continuous stirring for 1 hour. Protein content of 200 μL aliquot was also determined. To evaluate the thermal stability of solubility, the samples were heated for 30 min at 85° C. The samples (with or without heat treatment) were centrifuged for 10 minutes at 13,000 rpm and 200 μL of supernatant was analyzed for protein content. The percent solubility of the protein was calculated based on following equation:

$$\text{Solubility (\%)} = \text{Protein content in the supernatant} / \text{protein content before centrifugation} * 100$$

Table 3 shows the results of the solubility of the various CP1 hydrolysates.

TABLE 3

Solubility of various CPI hydrolysates

| Sample | Solubility at pH 3.4 | Solubility at pH 7 | Solubility at pH 3.4 (with heat) | Solubility at pH 7 (with heat) |
|---|---|---|---|---|
| CP1 | 3.19 | 3.28 | 3.96 | 4.46 |
| 1 | 14.27 | 14.52 | 15.14 | 15.57 |
| 2 | 23.3 | 23.78 | 24.28 | 25.42 |
| 3 | 23.44 | 23.36 | 24.39 | 24.59 |
| 4 | 37.99 | 38.47 | 38.91 | 38.92 |
| 5 | 27.31 | 26.63 | 27.69 | 27.21 |

TABLE 3-continued

Solubility of various CPI hydrolysates

| Sample | Solubility at pH 3.4 | Solubility at pH 7 | Solubility at pH 3.4 (with heat) | Solubility at pH 7 (with heat) |
|---|---|---|---|---|
| 6 | 33.99 | 34.43 | 34.13 | 34.35 |
| 7 | 19.16 | 19.05 | 19.74 | 20.06 |
| 8 | 15.5 | 14.69 | 16.11 | 16.05 |
| 9 | 24.96 | 26.26 | 25.68 | 27.66 |
| 10 | 13.73 | 14.49 | 14.41 | 15.29 |
| 11 | 12.11 | 13.01 | 12.93 | 13.69 |
| 12 | 20.61 | 21.31 | 21.76 | 22.24 |
| 13 | 24.03 | 25.49 | 24.67 | 26.51 |
| 14 | 14.61 | 15.69 | 15.76 | 16.85 |
| 15 | 13.6 | 14.1 | 13.85 | 14.73 |
| 16 | 14.4 | 14.5 | 15.55 | 15.59 |
| 17 | 13.2 | 13.4 | 14.08 | 14.23 |
| 18 | 13.9 | 13.5 | 14.71 | 14.65 |
| 19 | 11.7 | 11.5 | 11.98 | 11.83 |
| 20 | 11.7 | 11.4 | 11.64 | 12.08 |
| 21 | 17.44 | 18.73 | 18.24 | 19.05 |
| 22 | 20.92 | 22.31 | 21.20 | 23.56 |
| 23 | 20.22 | 22.05 | 20.53 | 21.61 |
| 24 | 25.48 | 26.57 | 26.57 | 28.45 |
| 25 | 34.79 | 35.19 | 35.19 | 35.76 |
| 26 | 15.3 | 16 | 16.01 | 16.28 |
| 27 | 19.9 | 20 | 20.52 | 20.69 |
| 28 | 10.46 | 11.19 | 11.13 | 11.64 |
| 29 | 10.11 | 10.36 | 10.34 | 11.89 |
| 30 | 8.61 | 8.79 | 8.52 | 9.66 |
| 31 | 10.33 | 10.12 | 10.85 | 13.23 |
| 32 | 30.96 | 31.74 | 31.70 | 32.51 |
| 33 | 15.95 | 16.25 | 16.44 | 16.54 |
| 34 | 13.68 | 13.7 | 14.18 | 14.12 |
| 35 | 9.04 | 9.63 | 9.56 | 9.94 |
| 36 | 11.94 | 13.02 | 12.88 | 13.58 |
| 37 | 22.37 | 22.68 | 22.91 | 23.89 |
| 38 | 34.78 | 35.72 | 33.32 | 34.84 |
| 39 | 2.8 | 2.8 | 3.30 | 3.40 |
| 40 | 2.8 | 2.8 | 3.30 | 3.10 |

Figure 2:
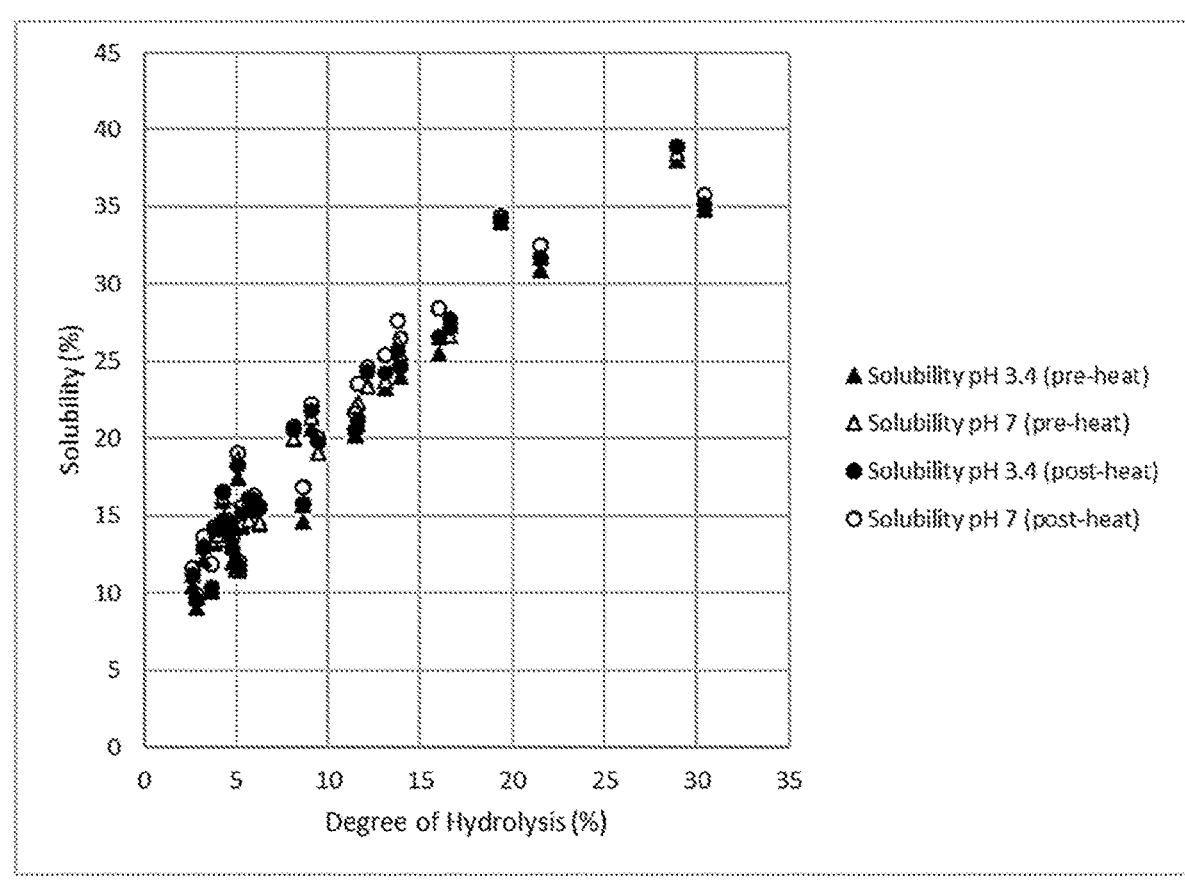
FIG. 2 is a graph of the relationship between protein solubility and degree of hydrolysis.

The CP1 hydrolysates showed a strong positive correlation between solubility determined at pH 3.4 and pH 7 in both heated and non-heated samples (FIG. 1). Moreover, solubility of the hydrolysates (regardless of the pH determined) showed a positive linear correlation with DH (FIG. 2).

Figure 3:
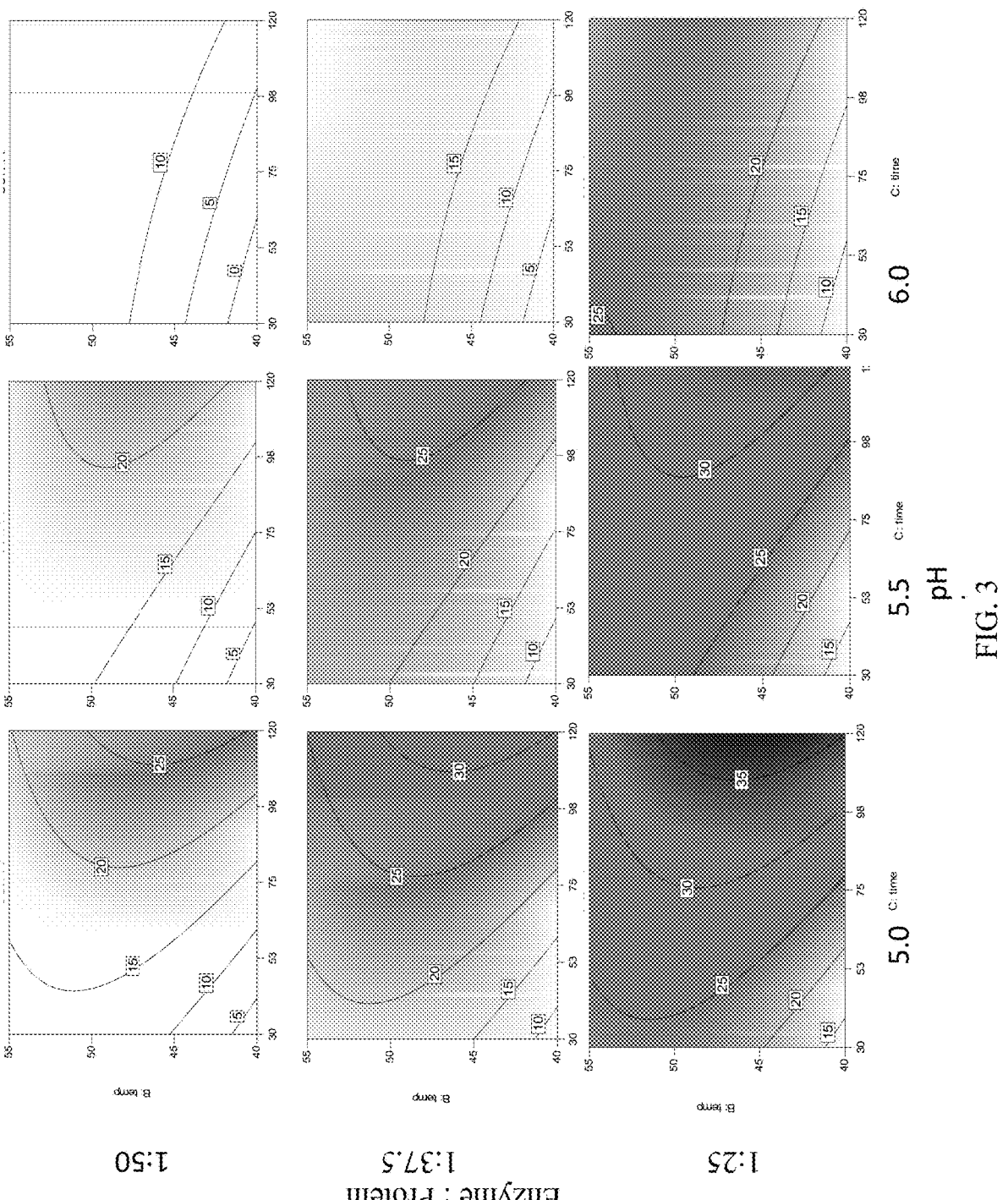
FIG. 3 is a plot showing the solubility of corn protein hydrolysates produced under various hydrolysis conditions.

Generally, solubility increased with the independent variables of time and enzyme dose, and decreased with increasing pH. FIG. 3 is a visualization of the solubility at pH 7 after heating (Z-axis) over a range of times (X-axis) and temperatures (Y-axis) at different pH (5.0, 5.5 and 6.0) and enzyme doses (1:25, 1:37.5, and 1:50) fixed. The lines on the graph indicate conditions with the same solubility. For example, with pH=5.0 and enzyme fixed at 1:25 (lower left panel), the contour line farthest to the right is the 35% solubility line. Each set of times and temperatures associated with that line results in 35% soluble material. The lines are not straight because there are interactions between the independent variables. Low solubility is shaded light and high solubility is shaded dark. Solubility increases with time and with temperature, and there is a decline in solubility when longer time is combined with higher temperature.

Figure 4:
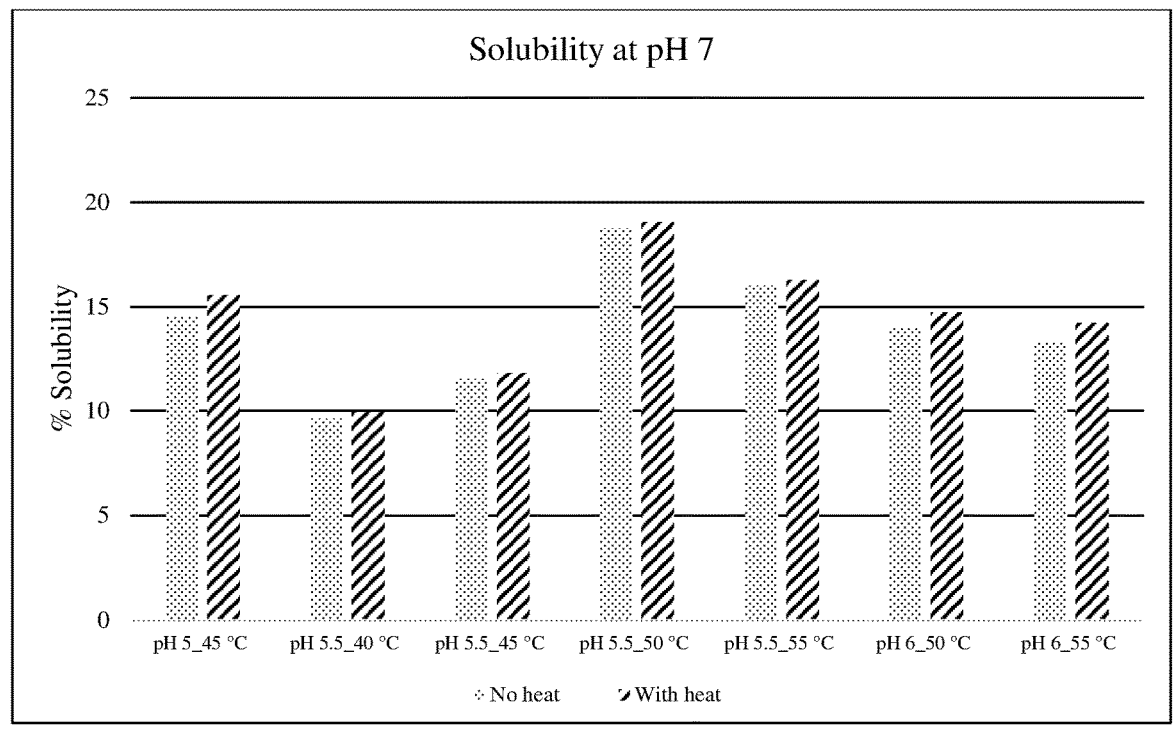
FIG. 4 is a graph of the effect of pH and temperature during hydrolysis on the solubility of a corn protein hydrolysate at pH 3.4
Figure 5:
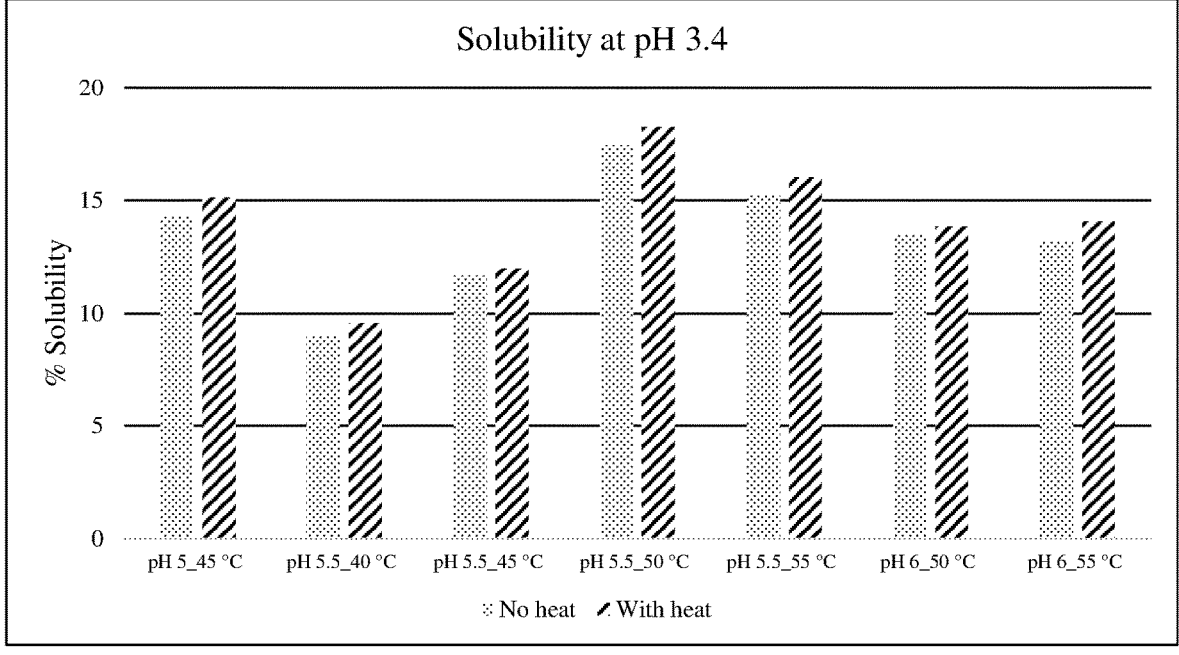
FIG. 5 is a graph of the effect of pH and temperature during hydrolysis on the solubility of a corn protein hydrolysate at pH 7.0.

In an aspect, at a pH of 5.5, temperature of 50° C., hydrolysis time of 60 minutes, and ratio of E:P concentration of 1:50, the CP1 hydrolysate resulted in a DH of about 2.4% with higher solubility (17-20%) compared to the CP1 hydrolysates produced at the pH and temperature combinations of 5.0 and 45° C., 5.5 and 40° C., 5.5 and 45° C., 5.5 and 55° C., 6.0 and 50° C., and 6.0 and 55° C., and had similar DH of about 2.4 or lower %) (FIGS. 4 and 5).

The particle sizes of the hydrolysates as prepared were determined by laser diffraction, which measures particle size distributions determined by angular variation in intensity of light scattered as a laser beam passes through a dispersed particulate sample. This dispersed particulate sample is generated as a slurry in mineral oil. A Malvern Mastersizer 3000 laser light diffraction particle size analyzer was used to conduct these measurements. The observed particle size distribution of selected samples is set forth in Table 4 below, wherein D10 is the diameter at which 10% of the sample's mass is comprised of particles with a diameter less than this value, D50 is the diameter at which 50% of the sample's mass is comprised of particles with a diameter less than this value (i.e., the median particle size), D90—is the diameter at which 50% of the sample's mass is comprised of particles with a diameter less than this value, and D [4,3] (μm) is the average particle size.

TABLE 4

Selected compositions exhibited the following particle sizes:

| | Dx (10) (μm) | Dx (50) (μm) | Dx (90) (μm) | D [4, 3] (μm) | Mode (μm) |
|---|---|---|---|---|---|
| CP1 | 3.72 | 7.76 | 12.8 | 8.04 | 9.17 |
| DH5 | 4.84 | 9.62 | 14.3 | 9.62 | 10.4 |
| DH10 | 5.42 | 9.61 | 14.1 | 9.65 | 10.3 |
| DH16 | 3.5 | 9.36 | 14.2 | 9.3 | 10.4 |
| DH30** | 5.58 | 9.93 | 14.7 | 10 | 10.6 |

Example 2

The Effect of Suspension pH on Final Solubility

Solubility of the intact and hydrolyzed CP1 was determined at pH 3,4, 5, 6, 7, 8 and 9 with and without thermal treatment (85° C. for 30 minutes). Protein solutions (10 mL at 5% protein) were prepared based on the protein content of the powder (determined by the Dumas method) at above mentioned pH with continuous stirring for 1 hour. Protein content of 200 μL aliquot was determined by the Dumas method. To evaluate the thermal stability, the samples were heated for 30 min at 85° C. The samples (with or without heat treatment) were centrifuged for 10 minutes at 13,000 rpm and 200 μL of supernatant was analyzed for protein content. The percent solubility of the protein was calculated based on following equation:

$$\text{Protein solubility (\%)} = 100 \times (\text{Protein concentration in the supernatant})/(\text{protein concentration in the suspension})$$

Proteins are heterogeneous polymers comprising potentially positively, negatively, and neutral amino acids side chains. Solubility is enhanced when the protein has a net charge and may be minimized when the net charge on the protein is approximately zero. Behaviorally, this means that some proteins precipitate near their isoelectric point, which is often between 4 and 6. Native soy protein isolate (SPI) and casein show an inverted bell shaped curve of solubility where higher solubilities were seen for ≤3 and ≥6 with the minimum at pH 4-5.5.

Figure 6:
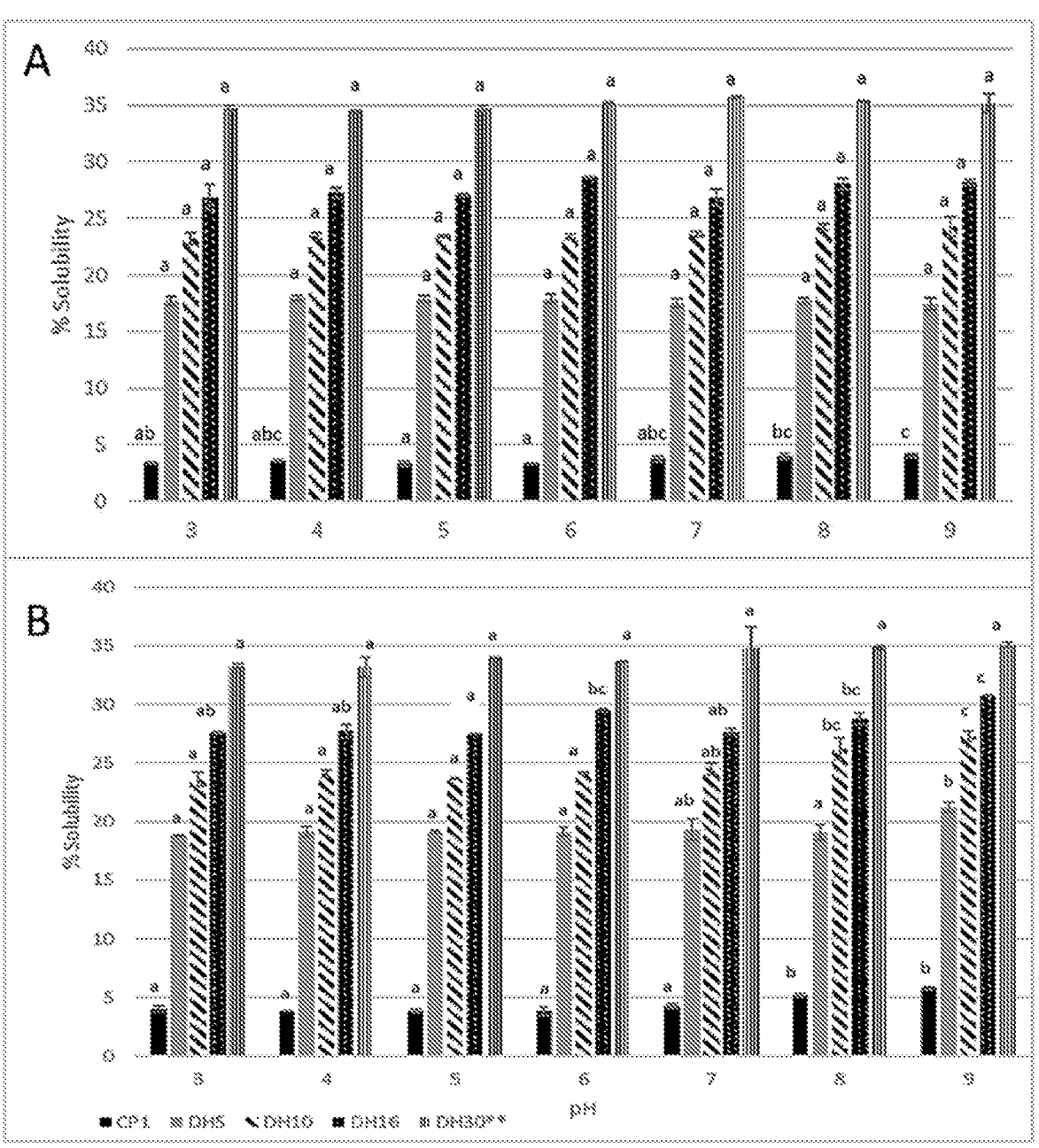
FIG. 6A is a graph of the effect of pH on solubility a corn protein hydrolysate without heat treatment.
FIG. 6B is a graph of the effect of pH on solubility a corn protein hydrolysate with heat treatment.

The effect of suspension pH on solubility of CP1, DH5, DH10, DH16 and DH30** (as identified in Table 2) without (A) and with (B) heat treatment is shown in FIG. 6A and FIG. 6B. A separate ANOVA was run for each sample with and without heat treatment. Bars associated with the same letters cannot be significantly distinguished (one-way ANOVA, Tukey means comparison test, p≤0.05).

CP1 samples behave differently. The solubility of all intact and hydrolyzed CP1 without heat treatment (FIG. 6A) are insensitive to changes in the suspension pH while CP1, DH5, DH10 and DH16 have slightly higher solubility after heat treatment at pH 8 and 9 compared to that of ≤7. DH30** has no change in solubility, as a function of pH, even after the heat treatment (FIG. 6B). Whey protein isolate, for example, shows minimal pH sensitivity before heating, but heating at pH 4-5 causes the protein to lose solubility. This is not observed with corn protein or its hydrolyzed versions.

The stability of solubility in mildly acidic conditions, with or without heating, is desirable in many foods processes where pH modification occurs. The manufacturer need not worry that temporary deviations in pH or temperature will have serious deleterious effects on the process, equipment of final product.

Example 3

The Effect of Protein Content Present During Hydrolysis on Final Solubility and Degree of Hydrolysis Example 1 describes production at a low solids concentration (5%), but a scaled up process would desirably use less water while achieving the same effect. Greater solids enable better capital utilization and lower operating costs, lower energy usage and possible advantages in powder property management.

CP1 hydrolysis was carried out upon mixing 5%, 10%, 15% and 20% protein solution for 1 hour in water at the conditions optimized for CP1_DH5 hydrolysate, which were pH 5.5 for 50° C. (volume of hydrolysate was 150 ml). The enzyme, protease M was then added in 1:100 of enzyme/substrate (E/S) ratio and the pH was adjusted every 15 minutes for 60 min to maintain the desired pH. Hydrolysis was followed by neutralizing with 1M NaOH and inactivating the enzyme by heating to 75° C. for 5 min. After hydrolysis, the sample was freeze dried. The solubility was determined at pH 3.4 and 7.

There is no significant difference in the final solubility at either pH 3.4 or 7 with and without heat treatment at the various protein concentrations tested. There is a larger variation between replicates seen in the 15% and 20% compared to 5% or 10%. This result shows that with right ratio of protease to substrate, this enzymatic hydrolysis is equally feasible in the 5%-20% solids range. The DH of the total hydrolysates from 10%, 15% and 20% protein suspensions was lower than 4.

Figure 7:
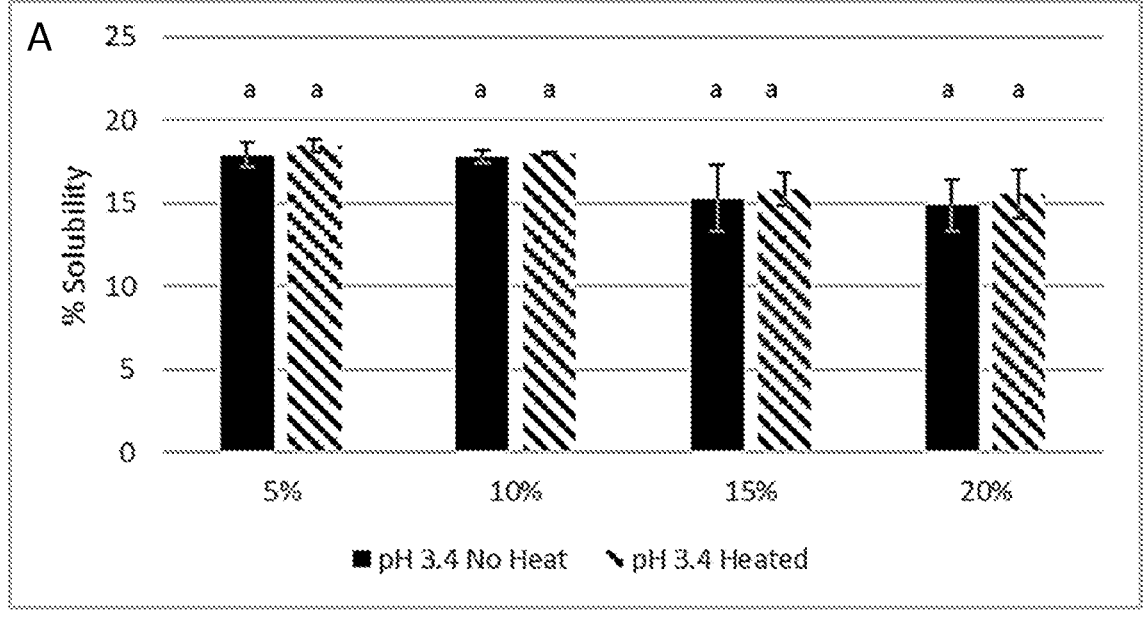
FIG. 7A is a graph of the effect of protein concentration during hydrolysis on solubility at pH 3.4.
FIG. 7B is a graph of the effect of protein concentration during hydrolysis on solubility at pH 7.
Figure 7:
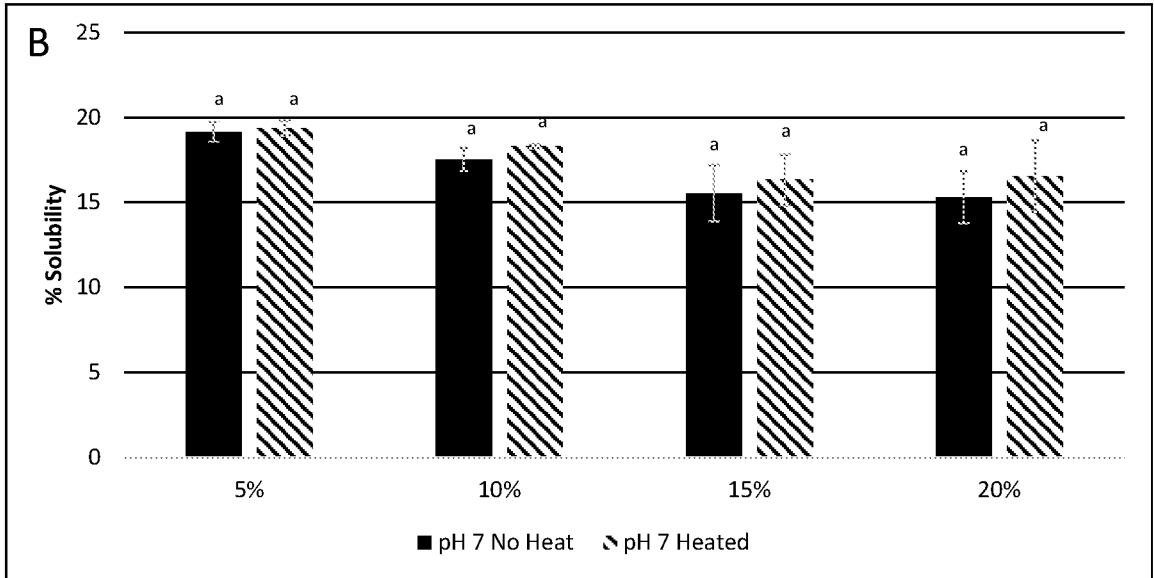

The effect of protein concentration during hydrolysis on solubility at pH 3.4 (A) and pH 7 (B) with and without heat treatment is shown in FIG. 7A and FIG. 7B, respectively. A separate ANOVA was run with and without heat treatment. Bars associated with different letters are significantly different (one-way ANOVA, Tukey means comparison test, p≤0.05).

Example 4

Protein Secondary Structure by Attenuated Total Reflectance-Fourier Transform Infrared Spectroscopy (ATR-FTIR)

CP1 and hydrolyzed corn protein samples were analyzed by Thermo Scientific Nicolet iS10 FTIR spectrometer (Thermo Fisher Scientific, Waltham, MA) equipped with a horizontal multi reflectance diamond accessary using the OMNIC 8 software. Secondary structure of intact and hydrolyzed samples were determined from second-derivative spectra of amide I regions (1600-1700 cm$^{-1}$). Spectral regions were assigned as 1600-1635 for β-sheets, 1636-1649 cm$^{-1}$ for α-helix, 1650-1680 cm$^{-1}$ for random, and 1681-1700 cm$^{-1}$ for β-turn structures. The second derivative area for each secondary structural region was divided by the total area of the amide I region. A minimum of 3 spectra were recorded per sample.

Figure 8:
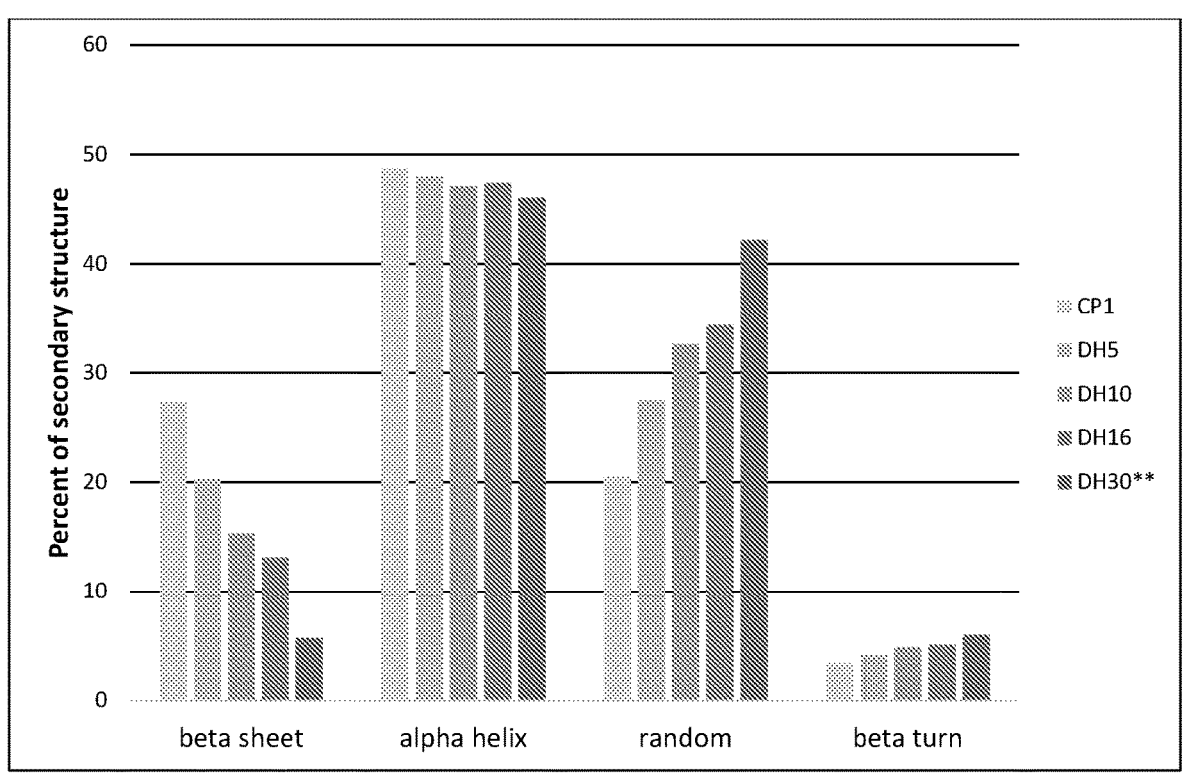
FIG. 8 is a graph showing the protein secondary structure of CP1, DH5, DH10, DH16 and DH30**.

For all samples (intact and hydrolyzed), α-helices comprised the dominant protein secondary structure as shown in FIG. 8. As the DH increased, n-sheet content was decreased with a gain in random structure. This might reflect release of peptide with no secondary structure from protein domains that had been structured. The content of α-helices stayed nearly unaffected by the enzymatic hydrolysis up to DH16, but it was lower in DH30** compared to CP1. Our results imply that the protease M could be more specific to regions of amino acids with beta sheets. The slight decrease in combination of enzyme activities and protein structures, the composition of the soluble fraction may differ from the initial composition in the proportion of amino acids. At very high DH, the soluble fraction will more closely resemble the starting material, but at lower DH there may be significant differences.

Table 5 shows the amino acid composition of the soluble fraction of material after treatment with Protease M as described in 1. To prepare the sample, the treated protein was suspended in water at pH 7 for 60 minutes, then centrifuged at 9500 rpm for 15 minutes. The supernatant and pellets were separately freeze dried and submitted for amino acid analyses (AOAC Official Method 988.15, chp. 45.4.04, 2006 for tryptophan and AOAC Official Method 982.30 E(a,b,c), chp 45.3.05 for the rest of the amino acids.

Expressed on a 100% protein basis, the projected composition of the soluble fraction (if it perfectly reflected the starting material can be calculated by multiplying the starting material composition by the solubility. After adjustment to a 100% protein basis again, the actual composition can be compared to the projected composition. In this example (Table 5), the soluble fraction is relatively enriched in aspartic acid, threonine, glycine, valine, lysine, histidine, arginine, and tryptophan (bold). The soluble fraction was relatively depleted in leucine (italics), in general. Glutamic acid, proline and phenylalanine were relatively depleted at lower DH but less distinctive as DH increased.

TABLE 5

Amino acid compositions of intact and soluble fractions after Protease M treatment together with the calculated over-abundance/underabundance observed. Overabundance is noted as bold and underabundance is indicated by italics.

| | Intact | Actual soluble (g/100 g) | | | | Actual/projected | | | |
|---|---|---|---|---|---|---|---|---|---|
| | CP1 | DH5 | DH10 | DH16 | DH30 | DH5 | DH10 | DH16 | DH30 |
| Aspartic Acid | 5.67 | 8.11 | 7.75 | 7.87 | 7.26 | 1.43 | 1.37 | 1.39 | 1.28 |
| Threonine | 3.09 | 3.95 | 3.78 | 3.85 | 3.59 | 1.28 | 1.22 | 1.25 | 1.16 |
| Serine | 4.18 | 4.45 | 4.20 | 4.20 | 4.61 | 1.07 | 1.00 | 1.00 | 1.10 |
| Glutamic Acid | 20.63 | 16.58 | 17.13 | 16.87 | 18.38 | *0.80* | *0.83* | *0.82* | 0.89 |
| Proline | 8.58 | 7.04 | 7.36 | 7.26 | 7.59 | *0.82* | 0.86 | 0.85 | 0.88 |
| Glycine | 2.54 | 4.06 | 3.83 | 3.80 | 3.27 | 1.60 | 1.51 | 1.50 | 1.29 |
| Alanine | 8.31 | 7.14 | 7.32 | 7.33 | 7.77 | 0.86 | 0.88 | 0.88 | 0.93 |
| Cysteine | 1.80 | 2.01 | 1.94 | 1.95 | 1.76 | 1.11 | 1.08 | 1.08 | 0.98 |
| Valine | 4.43 | 5.69 | 5.53 | 5.58 | 5.12 | 1.29 | 1.25 | 1.26 | 1.16 |
| Methionine | 2.42 | 2.29 | 2.22 | 2.29 | 2.05 | 0.95 | 0.92 | 0.95 | 0.85 |
| Isoleucine | 4.18 | 4.61 | 4.56 | 4.63 | 4.54 | 1.10 | 1.09 | 1.11 | 1.08 |
| Leucine | 16.05 | 11.18 | 11.93 | 11.90 | 13.34 | *0.70* | *0.74* | *0.74* | *0.83* |
| Tyrosine | 4.94 | 4.34 | 4.43 | 4.54 | 4.49 | 0.88 | 0.90 | 0.92 | 0.91 |
| Phenylalanine | 6.14 | 5.24 | 5.40 | 5.43 | 5.69 | *0.85* | 0.88 | 0.88 | 0.93 |
| Lysine | 1.40 | 4.03 | 3.74 | 3.58 | 2.87 | 2.88 | 2.67 | 2.56 | 2.06 |
| Histidine | 1.95 | 2.67 | 2.63 | 2.50 | 2.27 | 1.37 | 1.35 | 1.28 | 1.17 |
| Arginine | 2.94 | 4.81 | 4.61 | 4.55 | 3.94 | 1.64 | 1.57 | 1.55 | 1.34 |
| Tryptophan | 0.58 | 1.05 | 0.98 | 1.03 | 0.85 | 1.82 | 1.70 | 1.78 | 1.48 | helices may imply that the helices were directly attacked or were destabilized by adjacent hydrolytic events.

The Protein secondary structure of CP1, DH5, DH10, DH16 and DH30 are shown in FIG. 8**.

Example 5

Treatment of a protein with a proteolytic enzyme typically selects particular sites for hydrolysis. Depending on the The insoluble material may similarly be compared to the expected concentration. At lower DH, the insoluble fraction would be expected to more resemble the starting material since relatively little material was fractionated into the soluble phase, and this is what is observed (Table 4). The insoluble fraction had no overabundances, but lysine and arginine were underabundant across the treatments, and tryptophan became underabundant at higher DH.

TABLE 6

Amino acid composition of intact and soluble fractions after Protease M treatment
together with the calculated over-abundance/underabundance observed. Overabundance
is noted as bold and underabundance is indicated by italics.

| | Intact | Insoluble (g/100 g) | | | | Actual/projected | | | |
|---|---|---|---|---|---|---|---|---|---|
| | CP1 | DH5 | DH10 | DH16 | DH30 | DH5 | DH10 | DH16 | DH30 |
| Aspartic Acid | 5.67 | 5.20 | 5.17 | 5.07 | 5.03 | 0.92 | 0.91 | 0.89 | 0.89 |
| Threonine | 3.09 | 2.99 | 2.92 | 2.92 | 2.92 | 0.97 | 0.95 | 0.94 | 0.95 |
| Serine | 4.18 | 4.72 | 3.97 | 4.42 | 4.07 | 1.13 | 0.95 | 1.06 | 0.97 |
| Glutamic Acid | 20.63 | 21.71 | 21.52 | 21.89 | 21.52 | 1.05 | 1.04 | 1.06 | 1.04 |
| Proline | 8.58 | 8.93 | 9.11 | 9.11 | 9.17 | 1.04 | 1.06 | 1.06 | 1.07 |
| Glycine | 2.54 | 2.25 | 2.27 | 2.22 | 2.30 | 0.88 | 0.90 | 0.87 | 0.91 |
| Alanine | 8.31 | 8.48 | 8.62 | 8.64 | 8.66 | 1.02 | 1.04 | 1.04 | 1.04 |
| Cysteine | 1.80 | 1.73 | 1.80 | 1.79 | 1.87 | 0.96 | 1.00 | 0.99 | 1.04 |
| Valine | 4.43 | 4.18 | 4.20 | 4.08 | 4.16 | 0.94 | 0.95 | 0.92 | 0.94 |
| Methionine | 2.42 | 2.40 | 2.45 | 2.44 | 2.53 | 1.00 | 1.02 | 1.01 | 1.05 |
| Isoleucine | 4.18 | 4.04 | 4.08 | 3.97 | 4.01 | 0.97 | 0.98 | 0.95 | 0.96 |
| Leucine | 16.05 | 16.61 | 16.86 | 16.88 | 17.01 | 1.03 | 1.05 | 1.05 | 1.06 |
| Tyrosine | 4.94 | 4.85 | 4.98 | 4.98 | 5.01 | 0.98 | 1.01 | 1.01 | 1.01 |
| Phenylalanine | 6.14 | 6.16 | 6.29 | 6.22 | 6.24 | 1.00 | 1.02 | 1.01 | 1.02 |
| Lysine | 1.40 | 0.84 | 0.78 | 0.65 | 0.67 | *0.60* | *0.56* | *0.47* | *0.48* |
| Histidine | 1.95 | 1.77 | 1.80 | 1.74 | 1.78 | 0.91 | 0.92 | 0.89 | 0.91 |
| Arginine | 2.94 | 2.55 | 2.52 | 2.41 | 2.45 | *0.87* | *0.86* | *0.82* | *0.83* |
| Tryptophan | 0.58 | 0.52 | 0.50 | 0.48 | 0.47 | 0.90 | 0.87 | *0.83* | *0.82* |

Example 6

Surface Hydrophobicity

Changes in the configuration of a protein may change the exposure of polar and non-polar amino acid side chains. The relative effect of such changes can be assessed by measuring the binding of a hydrophobic compound to the protein, a measure called surface hydrophobicity.

This spectrofluorimetric method uses an aromatic fluorescent probe, 1-aniline 8-napthalene sulfonate (ANS), which emits detectable light when excited by light of an appropriate wavelength (Kato and Nakai, 1980; Alizadeh-Pasdar and Li-Chan, 2000). An ANS stock solution was made by suspending 0.03976 g ANS in 10 mL 0.1M pH 7.4 phosphate buffer and storing the stock in the dark (stable for 6 months). A working solution of ANS was made fresh every working day by diluting the ANS stock solution of 133 μL, in 3734 μL citric acid: sodium phosphate pH 7 buffer. Protein solutions were prepared (0.05% w/v) by weighing out the amount of powder necessary to reach 5 mg of protein each into a 15 mL centrifuge tubes, adding 10 mL of 0.1M Phosphate buffer, pH 7.4 to each tube, and adjusting the pH to 7.0. Using the 0.05% protein solutions, concentrations of 0.025, 0.02, 0.015, 0.01 and 0.005 w/v were prepared. 200 μL of 0.005-0.050% protein samples were loaded into a white opaque 96 well plate. Blanks contained only citric acid:sodium phosphate pH buffer. All the samples and blanks were prepared in triplicate. The relative fluorescence index (RFI) was measured by setting the excitation and emission wavelengths at 400/30 (excitation wavelength/full width at half-maximum) and 460/40 nm, respectively. Gain was set to 25. 20 μL of ANS probe solution was added to each sample and blank. The plate was shaken for 1 min, then left sitting for 15 minutes in the dark before measuring the RFI again.

Calculation of net RFI: Blanks (wells containing only citric acid:sodium phosphate buffer or containing citric acid:sodium phosphate buffer with ANS added) in each plate were averaged separately. For each plate, appropriate blank average was subtracted from each sample. The net RFI was calculated by subtracting the RFI of the sample without added ANS probe from the RFI of the corresponding sample with ANS. Net RFI vs. protein concentration (%) was plotted a linear regression trend-line. The initial slope of the linear regression is the protein surface hydrophobicity.

Upon CP1 hydrolysis, hydrophobic regions are more accessible, giving rise to increased surface hydrophobicity for DH5, DH10, DH16 (Figure B1); DH30** is not distinguishable from CP1.

Figure 9:
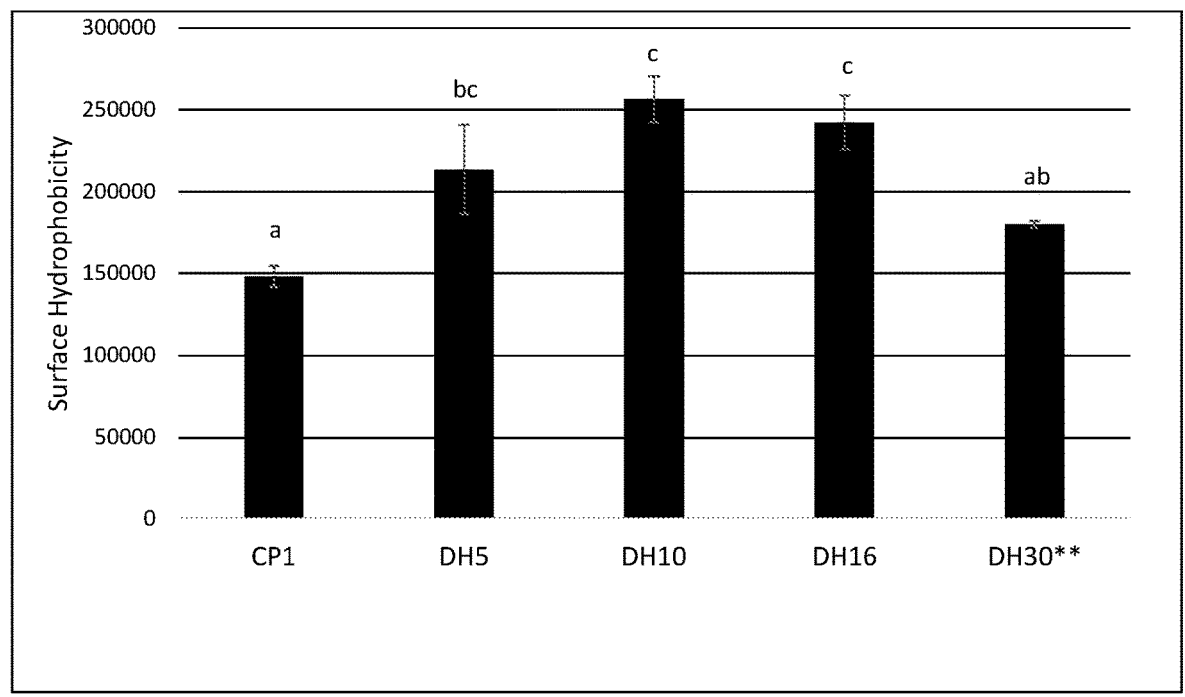
FIG. 9 is a graph showing the surface hydrophobicity of corn protein before and after enzyme treatment.

FIG. 9 shows surface hydrophobicity of corn protein before and after enzyme treatment. Bars with the same letter cannot be distinguished with α=0.05.

Example 7

Sensory Evaluation

Methodology

Samples for sensory evaluation were prepared by dispersing corn protein (5% w/v) and bitter reference standard caffeine (#1=0.107 g/L, #2=0.153 g/L, #3=0.2 g/L, #4=0.246 g/L and #5=0.293 g/L) into deionized water. A total of 21 individuals familiarized themselves with the series of caffeine reference solutions prior to evaluating the protein samples. To taste samples, evaluators dispensed approximately 2 mL of each into their own mouths by transfer pipet and dispersed by moving their tongues. Panelists tasted each protein solution and assigned a bitterness score compared to their perception of the caffeine reference solutions. Between samples, panelists had ad libitum access to water and rice crackers for palate cleansing.

TABLE 7

| | | | Results | | | |
|---|---|---|---|---|---|---|
| | Bitterness Score | 95% confidence interval | Bitterness Score Upper limit | Caffeine Equivalents (g/L) | 95% confidence interval | Caffeine Equivalents Upper Limit |
| CP1 | 2.78 | 0.76 | 3.54 | 0.19 | 0.04 | 0.23 |
| DH5 | 2.42 | 0.57 | 2.98 | 0.17 | 0.03 | 0.20 |
| DH10 | 2.55 | 0.61 | 3.16 | 0.18 | 0.03 | 0.21 |
| DH16 | 2.74 | 0.57 | 3.31 | 0.19 | 0.03 | 0.21 |
| DH30** | 2.97 | 0.70 | 3.67 | 0.20 | 0.03 | 0.23 |

SUMMARY

All the samples showed a bitterness score equal to or less than 3.67 corresponding to a caffeine equivalents equal to or less than 0.23 (g/L).

Hydrolysis under given conditions did not introduce a significant difference in bitterness compared to intact CP 1.

DH5 with the lowest degree of hydrolysis, has the lowest bitterness score of 2.42 with a caffeine equivalents of 0.17 (g/L), while DH30** with the highest degree of hydrolysis resulted in a score of 2.97 with a caffeine equivalents of 0.20 (g/L).

Example 8

Characterization of Enzyme

Commercial proteases are commonly mixtures of catalytic capabilities derived from multi-specificity individual enzymes and mixtures of enzymes of different specificity. Both the presence and absence of functionalities affects the outcome of enzyme modification. To understand the effects of an enzyme modification of a protein, it is beneficial to understand something about the mix and intensity of specific hydrolytic activities in an enzyme product. There are a potentially large number of ways to characterize an enzyme product, so a limited set of activities provide a practical description without being too time-consuming to execute. The following methods were used to assess activity in the present method. As used in this example, any reference to "enzyme" is a reference to the "enzyme product" which includes additional non-enzymatic components.

a) General Hydrolysis of Azocasein at pH 7

Azocasein (Sigma A2765) was used as a substrate to detect non-specific protease activity. A 2 wt % solution of azocasein was prepared in 50 mM $KH_2PO_4$—NaOH. The reaction mixture was composed by adding 0.5 mL of the same buffer to a 2 mL centrifuge tube. Tubes were set up for 0, 10, 20 and 30 minute time points. The time-zero tubes were placed on ice immediately after adding 50 μL of 100 wt % trichloroacetic acid in water. A 50 μL aliquot of diluted enzyme was added to each tube and the tubes were warmed in a 50° C. water bath. At timed intervals, 0.4 mL of the azocasein solution was added and a timer begun. Blanks were prepared but with 50 μL of buffer replacing the enzyme. At the designated time points, 50 μL of 100 wt % TCA was added to stop the reaction and stopped reactions immediately transferred to an ice bath.

Enzyme was diluted (or dissolved and diluted) into the reaction buffer described above. A range of dilutions were tested to demonstrate assay linearity with enzyme concentration. Only dilutions where the rate of pigment release was linear were included in subsequent analyses.

When all samples had been stopped, samples were centrifuged for 7.5 minutes at 16,000×g to sediment the unreacted protein.

A 100 μL aliquot of the supernatant was placed in the well of a 96-place microplate reader. To each well, 100 μL of buffer and 100 μL of 1M NaOH was added. The plate was read at 440 nm with a BioTek Synergy HT using Gen 5.1.11 software. The enzyme-free blanks were used to create a mean blank value which was subtracted from all "active" cells; any negative values were set to zero for time point 0. The slope of the change in absorbance was calculated.

One unit of activity was defined as a one-unit change in $\Delta A_{440}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{440}$/min/g enzyme product. Individual enzyme assay linearity was checked before inclusion in the analysis.

b) General Hydrolysis of Bovine Serum Albumin at pH 7

Bovine serum albumin, BSA, (Sigma A2153-50G) was used as a substrate to measure non-specific protease activity. A solution of 10 mg/mL BSA in 25 mM sodium phosphate buffer was prepared at pH 7. The enzyme was prepared by serial dilution in 25 mM sodium phosphate buffer at pH 7. Microcentrifuge tubes were labeled and arranged by enzyme concentration and time points (0, 10, 20, and 30 min). Using an autopipette, 950 μL BSA solution was added to each tube. The time-zero tubes were immediately placed in an ice bath and all other tubes placed in a water bath set to 50° C. to equilibrate. To inhibit enzyme activity and precipitate the protein, 50 μL 100% wt trichloroacetic acid (TCA) in water was added to the time-zero tubes. 50 μL of the appropriate enzyme solution was added to each time-zero tube. Once the 10, 20, and 30 min time point tubes were equilibrated, 50 μL of the appropriate enzyme solution was added, at timed intervals, to the corresponding tube. The timer was started at the first enzyme addition. Blanks were prepared with 50 μL buffer replacing the enzyme solution. At the appropriate time point, 50 μL 100% wt TCA was added to stop the reaction, the tube was removed from the water bath, shaken, and placed in an ice bath for at least 30 min. Samples were then centrifuged at 9100×g for 10 min.

To obtain accurate readings at 280 nm, the pH of the supernatant was adjusted to approximately 9.0. Sodium hydroxide (120 μL 0.5M) was added to each well of a UV-transparent 96-well microplate. 190 μL supernatant was added to the wells and the plate was gently agitated to mix. The plate was read at 280 nm using a microplate reader with Gen5 software.

The supernatants were also analyzed for free amino acids using TNBS (2,4,6-trinitrobenzene sulfonic acid). Prior to analysis a 0.5% solution of TNBS in ultra-pure water was prepared and stored in the refrigerator until use. Using a micropipette, 50 µL of each standard solution (0-6 mM Leucine in 0.01N HCl) was pipetted, in duplicate, into a 96 deep well plate. A 40 µL aliquot of each sample (supernatant) was transferred to the deep well plate along with 10 µL, 2.5% borate reagent at pH 9.5. Using a multi-channel pipette, 1 mL of the 2.5% borate reagent was added to each standard and sample well. To begin the reaction, 204, 0.5% TNBS was added to each well and a silicone cover was placed on the plate to seal individual wells. The plate was shaken to mix and placed, at room temperature, in the dark to develop. After 30 min, the cover was removed and 500 µL of freshly prepared 1M monobasic sodium phosphate was added to each well to stop the reaction. The plate was shaken again with a silicone cover and a 300 µL aliquot of each standard and sample solution was transferred to a 96 well microplate. The absorbance at 420 nm was measured and the leucine-equivalent concentration calculated using the averaged standard curves. One unit of activity was defined as the release of 1 µmol Leu-equiv./min. To derive the units/g of commercial enzyme product, the activities for each dilution were plotted against the mass of enzyme in the assay and the regression line of activity versus enzyme was computed. The slope represents the activity/g enzyme product.

c) General Hydrolysis of Hemoglobin

Enzymatic breakdown of hemoglobin was measured using two different measures. A 20 mg/mL solution of bovine hemoglobin (Sigma H2625) was prepared in 25 mM HEPES-HCl (pH 6.5). Enzyme was prepared by serial dilution into the ice-cold 25 mM HEPES buffer. Buffer (0.45 mL 25 mM HEPES-HCl (pH 6.5)) was pipetted into 2 mL microfuge tubes. For time zero samples, 50 µL of 100% TCA was added. Enzyme dilutions (50 µL) were added to each tube and tubes were placed in a 50° C. water bath to equilibrate. Reaction was initiated by addition of 500 µL of the hemoglobin solution. At 10, 20, and 30 minutes, 50 µL of 100% TCA was added and the tubes were transferred to an ice bath. Samples were centrifuged for 7.5 minutes at 16,000 g. The change in A280 was calculated as described above.

The release of alpha amino groups was measured using TNBS as described above.

For measurement of peptide release as indicated by absorbance at 280 nm, 120 µL of 0.5M NaOH was added to a flat bottomed 96-well, UV-compatible plate. Supernatant sample aliquots of 190 µL were added to each plate and gently mixed. The absorbance at 280 nm was recorded.

d) Glycine-Specific Hydrolysis

Enzyme activity specific to cleavage at glycine was tested using a synthetic chromophoric substrate. A 1 mM solution of glycine 4-nitroanilide-HCl (Sigma G4254) was prepared by dissolving 5 mg in 0.25 mL of DMSO and then diluting to 25 mL with 25 mM Na-HEPES-HCl (pH 6.75). Enzyme was prepared by serial dilution into the ice-cold 25 mM HEPES buffer. A 100 µL aliquot of enzyme was added to the well of a 96-place microtiter plate. Reaction was initiated by addition of 1004, of the substrate solution. The plate was placed into a 50° C. (pre-heated) BioTek Synergy HT device running Gen 5.1.11 software. The absorbance at 405 nm was measured at 0, 10, and 20 minutes after shaking.

One unit of activity was defined as a one-unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

e) Leucine-Specific Hydrolysis

Enzyme activity specific to cleavage at leucine was tested using a synthetic chromophoric substrate. A 1 mM solution of L-Leucine-p-nitroanilide (Sigma L2158) was prepared by dissolving 6.3 mg in 0.25 mL of DMSO and then diluting to 25 g with 25 mM Na-HEPES-HCl (pH 6.75). Enzyme was prepared by serial dilution into the 25 mM HEPES buffer. A 100 µL aliquot of enzyme was added to the well of a 96-place microtiter plate. Reaction was initiated by addition of 1004, of the substrate solution. The plate was placed into a 50° C. (pre-heated) BioTek Synergy HT device running Gen 5.1.11 software. The absorbance at 405 nm was measured at intervals from 0 to 30 minutes after shaking.

One unit of activity was defined as a one-unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

f) Methionine-Specific Hydrolysis

Enzyme activity specific to cleavage at methionine was tested using a synthetic chromophoric substrate. A 10 mM solution of L-methionine p-nitroanilide (Sigma M3529) was prepared by dissolving 4.8 mg in 1.78 mL of acetone. Enzyme was prepared by serial dilution into ice-cold 25 mM MOPS buffer (pH 7.5). A 50 µL aliquot of enzyme was added to the well of a 96-place microtiter plate together with 130 µL of the buffer at room temperature. Reaction was initiated by addition of 20 µL of the substrate solution. The plate was placed into a 50° C. (pre-heated) BioTek Synergy HT device running Gen 5.1.11 software. The absorbance at 405 nm was measured in intervals from 0 to 45 minutes after intermittent shaking.

One unit of activity was defined as a one-unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

g) Arginine-Specific Hydrolysis

Enzyme activity specific to cleavage at arginine was tested using a synthetic chromophoric substrate. A 10 mM solution of Na-Benzoyl-L-arginine 4-nitroanilide hydrochloride (Sigma B4875) was prepared by dissolving ~10 mg of substrate in 0.25 mL DMSO and then diluting to 25 g with 25 mM Na-HEPES (pH 6.75). Enzyme was prepared by serial dilution into ice-cold 25 mM Na-HEPES (pH 6.75). A 100 µL aliquot of enzyme was added to the well of a 96-place microtiter plate. Reaction was initiated by addition of 100 µL of the substrate solution. The plate was placed into a 50° C. (pre-heated) BioTek Synergy HT device running Gen 5.1.11 software. The absorbance at 405 nm was measured in intervals from 0 to 15 minutes after intermittent shaking.

One unit of activity was defined as a one-unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

h) Tyrosine-Specific Hydrolysis

Enzyme activity specific to cleavage at tyrosine was tested using a synthetic chromophoric substrate. A 10 mM solution of Na-Benzoyl-L-arginine 4-nitroanilide hydrochloride (Sigma B4875) was prepared by dissolving 11.6 mg of substrate in 2.32 mL acetone. Enzyme was prepared by serial dilution into ice-cold 25 mM MOPS-HCl (pH 7.5). An aliquot of 350 μL of room temperature buffer plus 100 μL of diluted enzyme was added to microfuge tubes. Reaction was initiated by adding 50 μL of substrate. Tubes were mixed and moved to a 50° C. water bath. The reaction was stopped at 1, 3.5 and 23 hours by addition of 50 μL of 100% w/w TCA and the tubes were chilled until all samples were collected. For the time-zero point, the TCA was added before addition of substrate. When finished, samples were centrifuged at 16,000 g for 7.5 minutes to settle precipitated protein and unreacted substrate. Samples (200 μL) were loaded onto a 96 well microtiter plate and read on a BioTek Synergy HT device running Gen 5.1.11 software. The absorbance at 405 nm was recorded. This reaction was very slow, so the only data point used for further analysis was that at 23 hours. As a check, pancreatin was also tested against the substrate in the same buffer system and showed a delta $A_{405}$ of greater than 0.63 within the first hour.

One unit of activity was defined as a one-unit change in $\Delta A_{405}/23$ hours. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}/23$ hr./g enzyme product.

The activities of Protease M in this set of assays is shown in the following Table 8.

| Substrate | Units | Activity (SE) |
|---|---|---|
| Azocasein | $\Delta A_{440}$/min/g | 200 (17) |
| Bovine serum albumin | $\Delta A_{280}$/min/g | 53.4 (2.8) |
| Bovine serum albumin | μmol Leu-equiv./min/g | 17.3 (0.5) |
| Bovine hemoglobin | $\Delta A_{440}$/min/g | 21.9 (1.0) |
| Bovine hemoglobin | $\Delta A_{280}$/min/g | 61.9 (3.2) |
| glycine 4-nitroanilide-HCl | $\Delta A_{405}$/min/g | 0.535 (0.023) |
| L-Leucine-p-nitroanilide | $\Delta A_{405}$/min/g | 10,399 (714) |
| L-Lysine p-nitroanilide dihydro-bromide | $\Delta A_{405}$/min/g | 1283 (44.9) |
| L-methionine 4-nitroanilide | $\Delta A_{405}$/min/g | 90.8 (4.2) |
| Nα-Benzoyl-L-arginine 4-nitroanilide hydrochloride | $\Delta A_{405}$/min/g | 2.28 (0.12) |
| Nα-Benzoyl-L-tyrosine 4-nitroanilide hydrochloride | $\Delta A_{405}$/23 hr/g | 35.9 (5.0) |

In an example where 1 g of Protease M is applied to 100 g of protein substrate, the activity being applied could also be described as about: 200 azocasein-degrading units, 53 casein-derived $A_{280}$-releasing units, 17 casein-derived alpha amine-releasing units, 0.54 glycine nitroanilide hydrolyzing units, 10,400 leucine nitroanilide hydrolyzing units, 1280 lysine nitroanilide hydrolyzing units, 91 methionine nitroanilide hydrolyzing units, 2.3 benzolyarginine nitroanilide hydrolyzing units and 36 benzoyl tyrosine nitroanilide hydrolyzing units. One skilled in the art would recognize that other measures of enzyme general and specific activity could be used to further specify the enzymatic activity profile being applied to achieve the desirable results of the present method.

The above detailed description includes references to the accompanying drawings, which form a part of the detailed description. The drawings show, by way of illustration, specific aspects in which the invention can be practiced.

These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The invention claimed is:

1. A corn protein hydrolysate having a corn protein concentration of at least about 79 wt % and a water solubility of from about 7% to about 37% at a pH selected from the group consisting of pH 7.0, pH 3.4, pH 5, and all of pH 7.0, pH 5, and pH 3.4, wherein the corn protein hydrolysate is obtained by a corn protein hydrolyzed by protease from *Aspergillus oryzae* and the protease targets specific sites on the com protein resulting in release of hydrophilic peptides, and wherein the com protein hydrolysate has a degree of hydrolysis of from about 1% to about 17%.

2. The com protein hydrolysate of claim 1, wherein the water solubility is from about 7% to about 20% at a pH selected from the group consisting of pH 7.0, pH 3.4, pH 5, and all of pH 7.0, pH 5, and pH 3.4.

3. The com protein hydrolysate of claim 1, wherein the water solubility is from about 15% to about 28% at a pH selected from the group consisting of pH 7.0, pH 3.4, pH 5, and all of pH7.0, pH 5, and pH 3.4.

4. The com protein hydrolysate of claim 1, wherein the corn protein concentration is from about 79 wt % to about 89 wt %.

5. A beverage comprising the corn protein hydrolysate of claim 1.

6. The beverage of claim 5, wherein the com protein hydrolysate is present as from about 1 wt % to about 10 wt % of the beverage.

7. The beverage of claim 5, wherein the beverage has a Caffeine Equivalents Value of less than 0.25 g/L.

8. The corn protein hydrolysate of claim 1, wherein the com protein hydrolysate has a Caffeine Equivalents Value of less than 0.25 g/L.

9. The com protein hydrolysate of claim 1, wherein the corn protein hydrolysate has a degree of hydrolysis of from about 10% to about 17%.

10. The corn protein hydrolysate of claim 1, wherein the com protein hydrolysate has a degree of hydrolysis of from about 3% to about 8%.

11. The com protein hydrolysate of claim 1, wherein the com protein hydrolysate has a degree of hydrolysis of from about 4% to about 6%.

\* \* \* \* \*